US012786955B2

(12) United States Patent
Brusilovsky et al.

(10) Patent No.: US 12,786,955 B2
(45) Date of Patent: Nov. 3, 2026

(54) PAGING METHOD FOR WTRU WITH MULTIPLE USIMS

(71) Applicant: InterDigital Patent Holdings, Inc., Wilmington, DE (US)

(72) Inventors: Alec Brusilovsky, Downingtown, PA (US); Xiaoyan Shi, Lake Oswego, OR (US); Ulises Olvera-Hernandez, Saint-Lazare (CA); Guanzhou Wang, Brossard (CA); Saad Ahmad, Montreal (CA); Samir Ferdi, Kirkland (CA); Behrouz Aghili, Commack, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 186 days.

(21) Appl. No.: 18/804,827

(22) Filed: Aug. 14, 2024

(65) Prior Publication Data

US 2024/0406933 A1 Dec. 5, 2024

Related U.S. Application Data

(63) Continuation of application No. 17/618,213, filed as application No. PCT/US2020/037913 on Jun. 16, 2020, now Pat. No. 12,101,739.

(Continued)

(51) Int. Cl.

*H04W 68/02* (2009.01)
*H04W 48/18* (2009.01)
*H04W 68/00* (2009.01)

(52) U.S. Cl.

CPC ........... *H04W 68/02* (2013.01); *H04W 48/18* (2013.01); *H04W 68/005* (2013.01)

(58) Field of Classification Search

None
See application file for complete search history.

(56) References Cited

U.S. PATENT DOCUMENTS

2009/0215472 A1 8/2009 Hsu
2009/0215473 A1 8/2009 Hsu (Continued)

FOREIGN PATENT DOCUMENTS

CN 101940043 A 1/2011
CN 104126325 A 10/2014

(Continued)

OTHER PUBLICATIONS

Third Generation Partnership Project, "Technical Specification Group Services and System; Study on System Enablers for Devices Having Multiple Universal Subscriber Identity Modules (USIM) (Release 17)", 3GPP TR 23.761 V0.3.0, Jan. 2020, 36 pages.

(Continued)

*Primary Examiner* — Frantz Bataille
(74) *Attorney, Agent, or Firm* — Flaster Greenberg P.C.

(57) ABSTRACT

A method for use in wireless transmit/receive unit (WTRU) which assesses both a first network and a second network to receive radio frames from each of the first network and the second network is disclosed. The method comprise: obtaining a first paging occasion (PO) as the first network's current PO and a second PO as the second network's current PO; determining whether there is a PO collision between the first PO and the second PO, on condition that there is the PO collision, selecting a network from the first network and the second network, and sending a request to the selected network; receiving, from the selected network, a collision avoidance parameter corresponding to the request; calculating a third PO for the selected network using the collision avoidance parameter, and using the third PO as the selected network's current PO.

20 Claims, 17 Drawing Sheets

Related U.S. Application Data

(60) Provisional application No. 62/932,246, filed on Nov. 7, 2019, provisional application No. 62/910,145, filed on Oct. 3, 2019, provisional application No. 62/862,450, filed on Jun. 17, 2019.

(56) References Cited

U.S. PATENT DOCUMENTS

| | | | |
|---|---|---|---|
| 2012/0113843 A1 | 5/2012 | Watfa et al. | |
| 2012/0264483 A1 | 10/2012 | Chin et al. | |
| 2013/0316718 A1 | 11/2013 | Hsu et al. | |
| 2014/0128082 A1* | 5/2014 | Chirayil | H04W 68/02 455/438 |
| 2017/0280473 A1 | 9/2017 | Krishnamoorthy et al. | |
| 2019/0174449 A1* | 6/2019 | Shan | H04W 60/00 |
| 2019/0174571 A1 | 6/2019 | Deenoo et al. | |
| 2019/0281580 A1 | 9/2019 | Rune et al. | |

FOREIGN PATENT DOCUMENTS

| | | |
|---|---|---|
| CN | 109479257 A | 3/2019 |
| EP | 2737762 A1 | 6/2014 |
| WO | 2011056250 A1 | 5/2011 |
| WO | 2011056252 A1 | 5/2011 |
| WO | 2017165126 A1 | 9/2017 |

OTHER PUBLICATIONS

Third Generation Partnership Project, "Technical Specification Group Services and System; General Packet Radio Service (GPRS) enhancements for Evolved Universal Terrestrial Radio Access Network (E-UTRAN) access (Release 16)", 3GPP TS 23.401 V16.3.0, Jun. 2019, 423 pages.
Third Generation Partnership Project, "Technical Specification Group Services and System; General Packet Radio Service (GPRS) enhancements for Evolved Universal Terrestrial Radio Access Network (E-UTRAN) access (Release 16)", 3GPP TS 23.401 V16.6.0, Mar. 2020, 436 pages.
Third Generation Partnership Project, "Technical Specification Group Services and System; System Architecture for the 5G System; Stage 2 (Release 16)", 3GPP TS 23.501 V16.0.0 Mar. 2019, 318 pages.
Third Generation Partnership Project, "Technical Specification Group Services and System; System Architecture for the 5G System; Stage 2 (Release 16)", 3GPP TS 23.501 V16.1.0, Jun. 2019, 368 pages.
Third Generation Partnership Project, "Technical Specification Group Services and System; System Architecture for the 5G System (5GS) Stage 2, Release 16" 3GPP TS 23.501 V16.3.0, Dec. 2019, 417 pages.
Third Generation Partnership Project, "Technical Specification Group Services and System; System Architecture for the 5G System (5GS); Stage 2 (Release 16)", 3GPP TS 23.501 V16.4.0, Mar. 2020, 430 pages.
Third Generation Partnership Project, "Technical Specification Group Services and System; Procedures for the 5G System; Stage 2 (Release 16)", 3GPP TS 23.502 V16.0.0, Mar. 2019, 420 pages.
Third Generation Partnership Project, "Technical Specification Group Services and System; Procedures for the 5G System", 3GPP TS 23.502 V16.1.Jun. 1, 2019, 495 pages.
Third Generation Partnership Project, "Technical Specification Group Services and System; Procedures for the 5G System (5GS); Stage 2 (Release 16)", 3GPP TS 23.502 V16.3.0, Dec. 2019, 558 pages.
Third Generation Partnership Project, "Technical Specification Group Services and System; Procedures for the 5G System (5GS)", 3GPP TS 23.502 V16.4.0, Mar. 2020, 582 pages.
Third Generation Partnership Project, "Technical Specification Group Services and System; Non-Access-Stratum (NAS) Protocol for 5G System (5GS); Stage 3 (Release 16),", 3GPP TS 24.501 V16.1.0, Jun. 2019, 541 Pages.
Third Generation Partnership Project, "Technical Specification Group Services and System; Non-Access-Stratum (NAS) Protocol for 5G System (5GS)", 3GPP TS 24.501 V16.4.1, Mar. 2020, 666 pages.
Third Generation Partnership Project, "Technical Specification Group Services and System; User Equipment (UE) Procedures in Idle Mode and RRC Inactive state (Release 15)", 3GPP TS 38.304 V15.1.0, Sep. 2018, 27 pages.
Third Generation Partnership Project, "Technical Specification Group Services and System; User Equipment (UE) procedures in Idle mode and RRC Inactive state (Release 15)", 3GPP TS 38.304 V15.3.0, Mar. 2019, 29 pages.
Third Generation Partnership Project, "Technical Specification Group Services and System; User Equipment (UE) procedures in Idle mode and RRC Inactive state (Release 15)", 3GPP TS 38.304 V15.6.0, Dec. 2019, 30 pages.
Third Generation Partnership Project, "Technical Specification Group Services and System; User Equipment (UE) procedures in Idle mode and RRC Inactive state", 3GPP TS 38.304 V16.0.0, Mar. 2020, 38 pages.
Third Generation Partnership Project, "Technical Specification Group Services and System; NG Application Protocol (NGAP) (Release 15)", 3GPP TS 38.413 V15.3.0, Mar. 2019, 319 pages.
Third Generation Partnership Project, "Technical Specification Group Services and System; NG Application Protocol (NGAP) (Release 15)", 3GPP TS 38.413 V15.7.0, Mar. 2020, 331 pages.
Third Generation Partnership Project, "Technical Specification Group Services and System; NG Application Protocol (NGAP) (Release 16)", 3GPP TS 38.413 V16.1.0, Mar. 2020, 341 pages.
European Telecommunications Standards Institute, "Smart Secure Platform (SSP); Part 1; General Characteristics (Release 15)", ETSI TS 103 666-1 V15.2.0, Apr. 2020, 148 pages.
European Telecommunications Standards Institute, "Smart Secure Platform (SSP); Part 2; Integrated SSP (iSSP) characteristics (Release 15)", ETSI TS 103 666-2 V15.2.0, Jun. 2020, 95 pages.
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Ver.y High Throughput for Operation in Bands below 6GHz, IEEE Std 802.11 ac-2013 (Dec. 11, 2013), 198 pages.
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces( TVWS) Operation, IEEE 802.11af-2013 (Dec. 11, 2013), 425 pages.
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016), 594 pages.
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11 n-2009 (Sep. 2009), 536 pages.
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016), 3534 pages.
Qualcomm Incorporated et al., "Solution for paging collision avoidance," SA WG2 Meeting #S2-135, S2-1909937, Split Croatia (Oct. 14-18, 2019).
Intel et al., "Key issue on mechanism for paging collision avoidance," SA WG2 Meeting #S2-135, S2-1910468, Split Croatia (Oct. 14-18, 2019).
Intel et al., "Solution for Paging Reception with PO collision avoidance," SA WG2 Meeting #S2-136, S2-1911942, Reno, NV, US (Nov. 18-22, 2019).

(56) References Cited

OTHER PUBLICATIONS

Ericsson et al., "MUSIM solutions for Key Issue 3," SA WG2 Meeting #136-AH, S2-2001719, Incheon, Korea (Jan. 13-27, 2020).

* cited by examiner

PAGING METHOD FOR WTRU WITH MULTIPLE USIMS

CROSS-REFERENCE TO RELATED APPLICATIONS

This application is a continuation of U.S. application Ser. No. 17/618,213, filed Dec. 10, 2021, is the U.S. National Stage, under 35 U.S.C. § 371, of International Application No. PCT/US2020/037913 filed Jun. 16, 2020, which claims the benefits of U.S. Provisional Application No. 62/862,450, filed June 17, 2019; U.S. Provisional Application No. 62/910, 145, filed Oct. 3, 2019, and U.S. Provisional Application No. 62/932,246, filed Nov. 7, 2019, the contents of which are incorporated herein by reference.

BACKGROUND

In a wireless communication system there may be a medium access control layer that handles various functions, such as services related to different types of channels. For example, there may be a paging channel (PCH), which may support discontinuous reception (DRX), which may allow a wireless device to save battery power by waking up to receive the PCH only at predefined time instants. As wireless technology advances, there is a need to improve and offer innovations to the various systems currently in place to ensure new use cases are properly addressed.

SUMMARY

A method for use in wireless transmit/receive unit (WTRU) which assesses both a first network and a second network to receive radio frames from each of the first network and the second network. The method comprise: obtaining a first paging occasion (PO) as the first network's current PO and a second PO as the second network's current PO; determining whether there is a PO collision between the first PO and the second PO, on condition that there is the PO collision, selecting a network from the first network and the second network, and sending a request to the selected network; receiving, from the selected network, a collision avoidance parameter corresponding to the request; calculating a third PO for the selected network using the collision avoidance parameter, and using the third PO as the selected network's current PO.

A method used in wireless transmit/receive unit (WTRU) which assesses to both a first network and a second network to receive paging frames from each of the first network and the second network. The method comprise: obtaining a first paging occasion (PO) as the first network's current PO and a second PO as the second network's current PO; determining whether there is a first PO collision between the first PO and the second PO, on condition that there is the first PO collision, sending a request to the second network; receiving, from the second network, a collision avoidance parameter corresponding to the request; calculating a third PO for the second network using the collision avoidance parameter, and substituting the third PO for the second PO as the second network's current PO.

A wireless transmit/receive unit (WTRU) which assesses both of a first network and a second network to receive radio frames from each of the first network and the second network. The WTRU comprise: a processor, configured to obtain a first PO as the first network's current PO and a second PO as the second network's current PO; and determine whether there is a PO collision between the first PO and the second PO, on condition that there is the PO collision, the processor is further configured to select a network from the first network and the second network, and a transmitter, configured to send a request to the selected network and receive, from the selected network, a collision avoidance parameter corresponding to the request, wherein the processor is further configured to calculate a third PO for the selected network using the collision avoidance parameter and use the third PO as the selected network's current PO.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
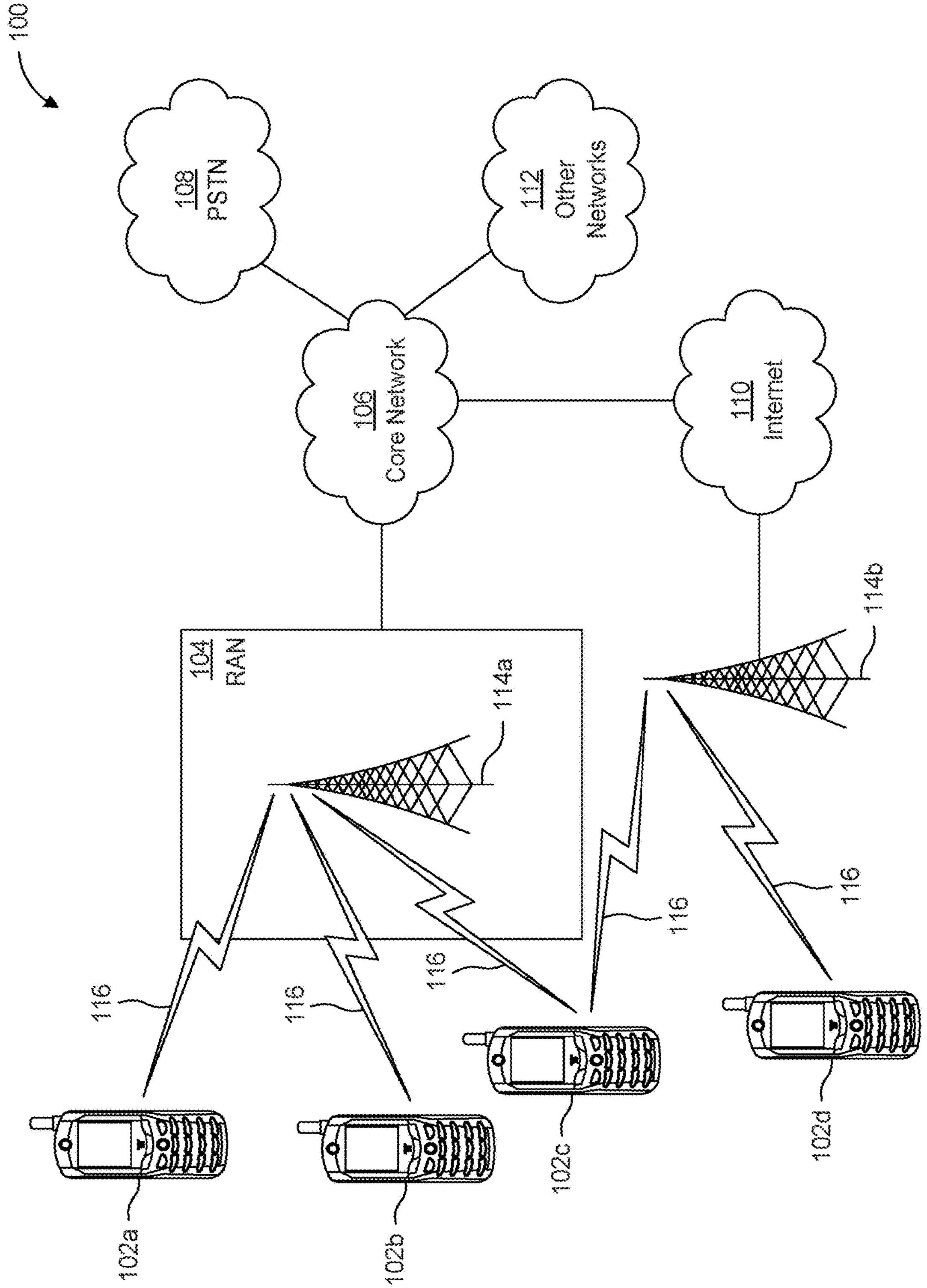
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
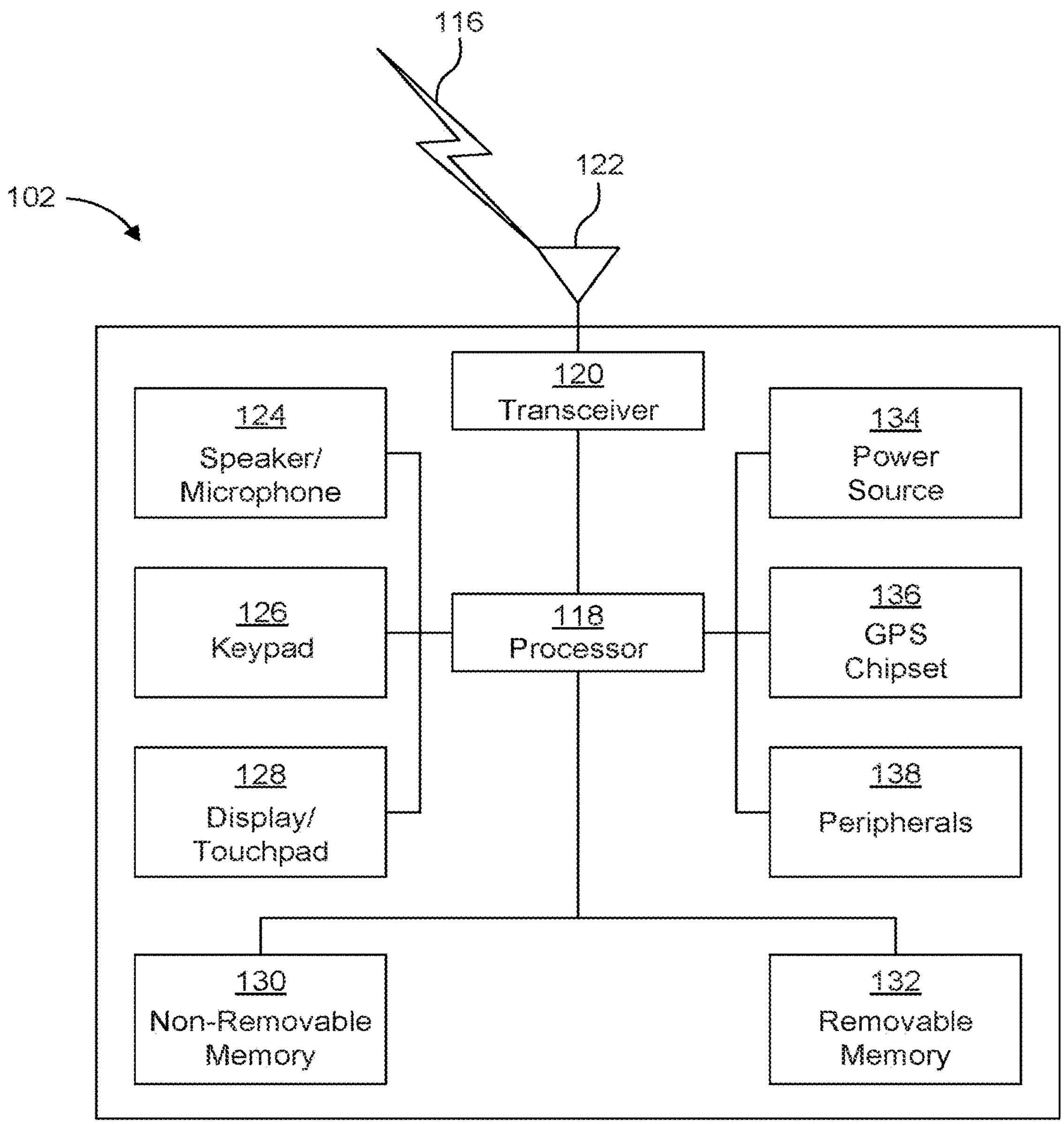
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
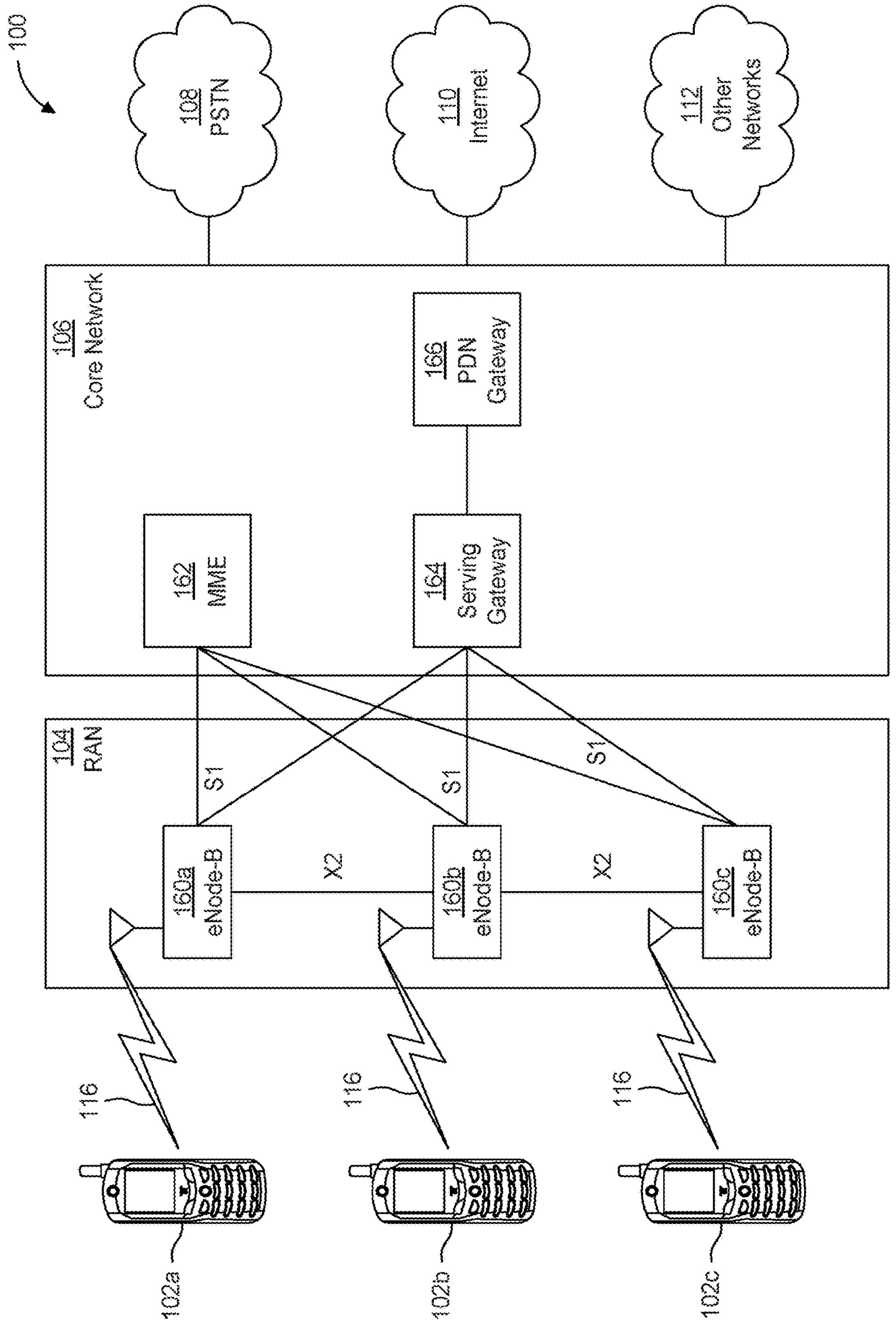
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
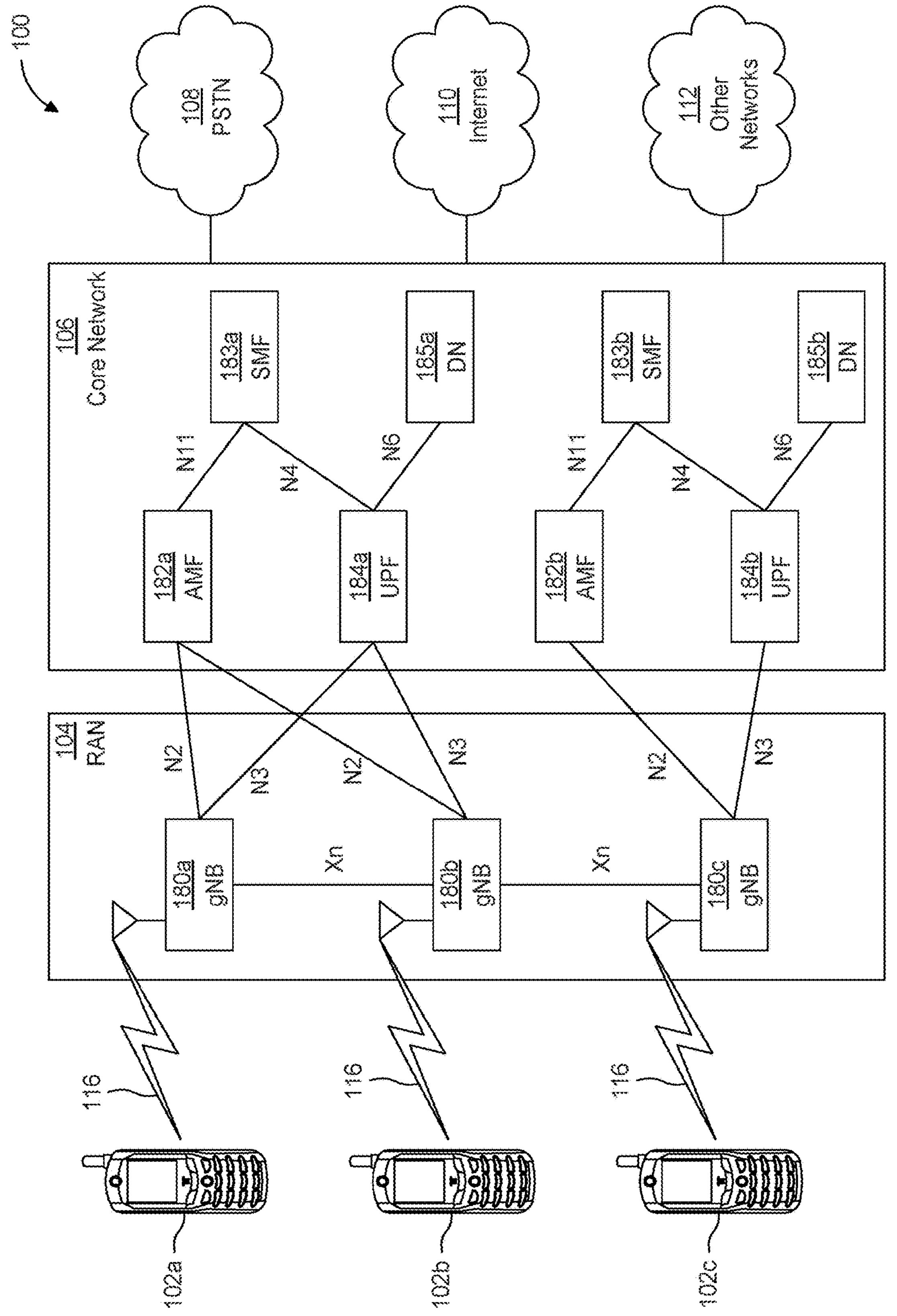
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
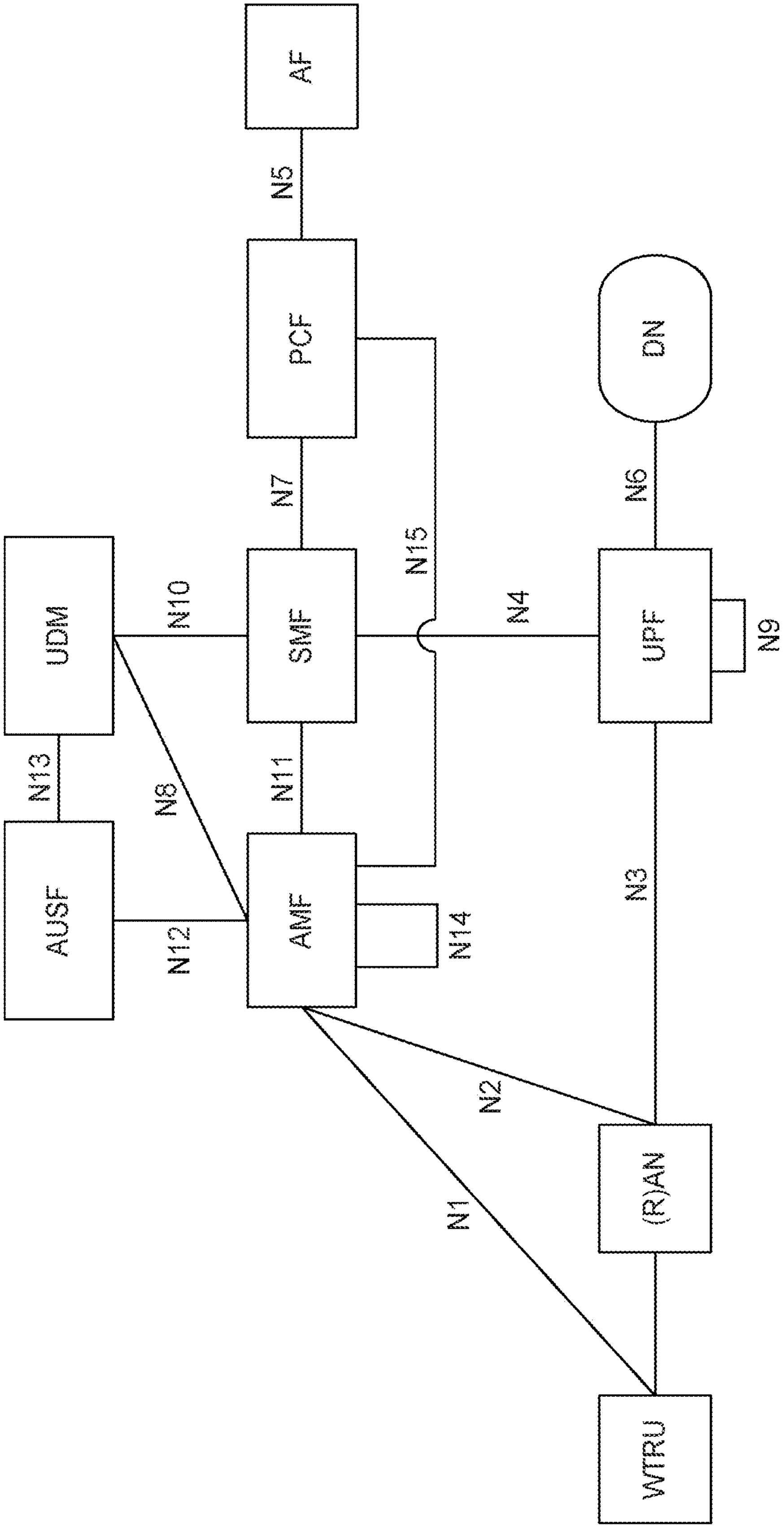
FIG. 2 is a diagram illustrating an example of a reference model of 5G/NextGen Network.

FIG. 2 is a diagram illustrating an example of a reference model of 5G/NextGen Network. The RAN may be based on a 5G radio access technology (RAT) or Evolved E-UTRA that connects to the 5G/NextGen core network. Since those components of the reference model shown in FIG. 2 are already well-known, some of them related to the embodiments in this application will be briefly introduced below, and descriptions of other components shown will be omitted.

The access control and mobility function (AMF) may include the following functionalities: Registration management, Connection management, Reachability management, Mobility Management, and the like.

The Session Management Function (SMF) may include the following functionalities: Session Management (including Session establishment, modify, and release), WTRU IP address allocation, Selection and control of UP function, and the like.

The User plane function (UPF) may include the following functionalities: Packet routing & forwarding, Packet inspection, Traffic usage reporting, and the like.

The WTRU represents a UE (User Equipment) which could be able to connect with the network, such as the WTRUs 102*a*, 102*b*, 102*c* shown in FIGS. 1A-1D. Here in this application, WTRU and UE may be used interchangeably.

The example shown in FIG. 2 will be further described in detail as follows. N1 may be an interface between UE and AMF for NAS signaling delivery. N2 may be an interface between RAN and AMF for signaling delivery. N3 may be an interface between RAN and UPF for user data delivery. N4 may be an interface between SMF and UPF for N4 session management. N5 may be an interface between AF and PCF. N6 may be an interface between UPF and data network. It will be appreciated that the above discussed elements from N1-N6 are only given by way of example, and they are not intended to be exclusive or be limiting to the embodiments in this application.

Figure 3:
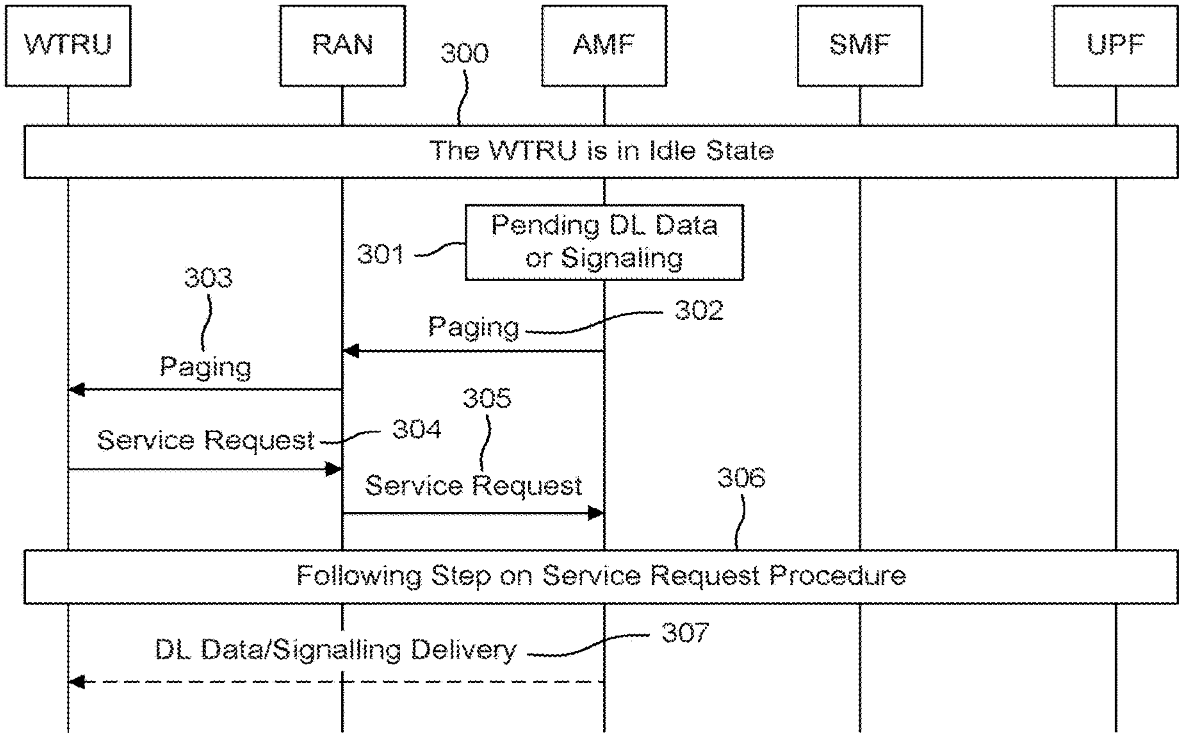
FIG. 3 is a diagram illustrating an example of a network triggered service request procedure.

FIG. 3 is a diagram illustrating an example of a network triggered service request procedure. The network triggered service request procedure is now described with reference to both FIG. 3 and the network shown above in FIG. 2. As shown in FIG. 3, at 300, the WTRU is in an idle mode (or an idle state). Then, at 301, the network needs to signal with the WTRU. For example, there may be a pending DL data or signaling information, such as N1 signaling to WTRU, Mobile-terminated SMS, Mobile terminated user data, etc. Then, at 302, the AMF sends paging message to RAN node(s). Then, at 303, the RAN performs paging on the radio interface and transmits the paging message to the WTRU. After receiving the paging message from the RAN, the WTRU may send a Service Request message to the network as a response and establish a connection with the network by a Service Request procedure from 304 to 306. Then, the network delivers the DL data or signaling information to the WTRU at 307. It should be noted that the above description regarding the network triggered service request procedure with reference to FIGS. 2-3 is only given as a way of illustration and example, and it's not intended to be exclusive or be limiting to the principle of the network triggered service request procedure. It should be noted that when discussing a network in this application, it may represent an AMF of the network and/or a base station. Therefore, in order to facilitate the description in this application, the terms "AMF", "base station" and "network" may collectively be referred to as "network".

Figure 4:
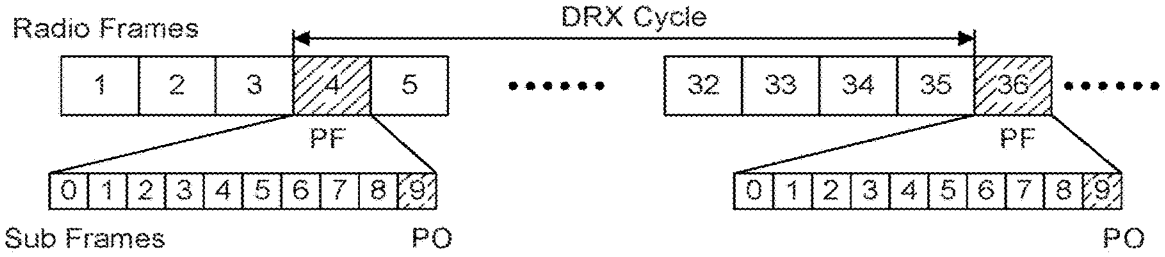
FIG. 4 is a diagram illustrating an example of a paging frame and paging occasion.

FIG. 4 is a diagram illustrating an example of paging frame and paging occasion. FIG. 4 illustrates multiple radio frames, such as radio frame 1, radio frame 2, etc. Those radio frames are the ones transmitted from a network (e.g., a base station) to a WTRU. When there is no transmission between the WTRU and the base station, the WTRU will turn into the Idle mode for reducing the WTRU's power consumption. The definition "Idle mode" does not mean that the WTRU will stay idle all the time. Basically, the WTRU will wake up on a regular basis and check with the base station (e.g., monitor the network) to see if there is any information to be transmitted from the base station. The radio frame in which the WTRU wakes up is called paging frame. The time period between two adjacent paging frames is referred to as Discontinuous Reception (DRX) cycle, also known as paging cycle. Each radio frame may comprise multiple subframes. Since the paging frame is one of the radio frames, it also comprises multiple subframes. For example, as shown in FIG. 4, each radio frame comprises 10 subframes, and the paging frame (PF) also comprises 10 subframes. The WTRU does not remain awake in all 10 subframes within the paging frame. Instead, it will only wake up in a specific subframe or specific subframes within a radio frame. This specific subframe(s) within a paging frame when the WTRU may wake up is referred to as paging occasion (PO). As shown in FIG. 4, the paging frame (PF) is radio frame 4, which contains only one paging occasion (PO), i.e., subframe 9. Within the cycle shown in FIG. 4, the WTRU only needs to wake up and monitor once at the PO per DRX cycle.

It should be noted that the above description regarding the paging frame and the paging occasion with reference to FIG. 4 is only given by way of illustration and example, and it's not intended to be exclusive or be limiting to the principle of this application. Different paging frames and/or paging occasions may be determined or selected as long as they may help to realize the principle of this application. For example, there may be two or more paging occasions within a paging frame. Therefore, in this application, unless otherwise indicated, the definition "paging occasion" may represent one or more paging occasions. The following description will further discuss paging frame and paging occasion with reference to detailed embodiments below.

The WTRU and RAN may determine paging frame (PF) and paging occasion (PO) based on one or more parameters, such as WTRU ID (e.g. 5G-S-TMSI of the WTRU), DRX cycle of the WTRU, etc. For example, the paging frame and the paging occasion may be calculated by this equation: SFN mod T=(T div N)*(WTRU_ID mod N) and i_s=floor (WTRU_ID/N) mod Ns. When the AMF sends a paging message to RAN (e.g., at 22 shown in FIG. 2), the AMF may include the parameter(s) (e.g., the WTRU ID and the DRX cycle) in the paging message. Then the RAN may determine and obtain paging occasion using the parameter(s) and then perform paging at the obtained paging occasion. Then, after the WTRU receives the parameter(s) from the RAN, the WTRU may also determine and obtain a paging occasion, and wake up at the obtained paging occasion.

Figure 5A:
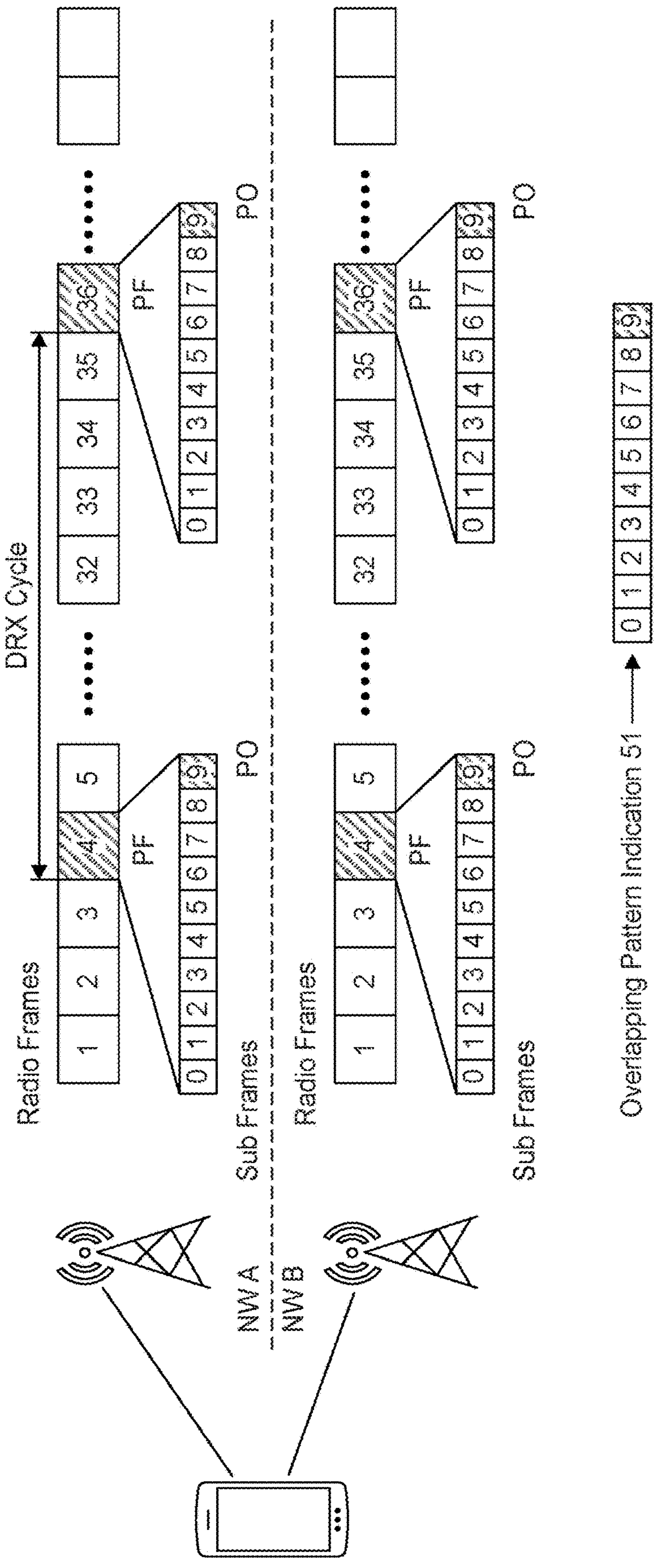
FIG. 5A is a diagram illustrating an example of paging occasion collision.
Figure 5B:
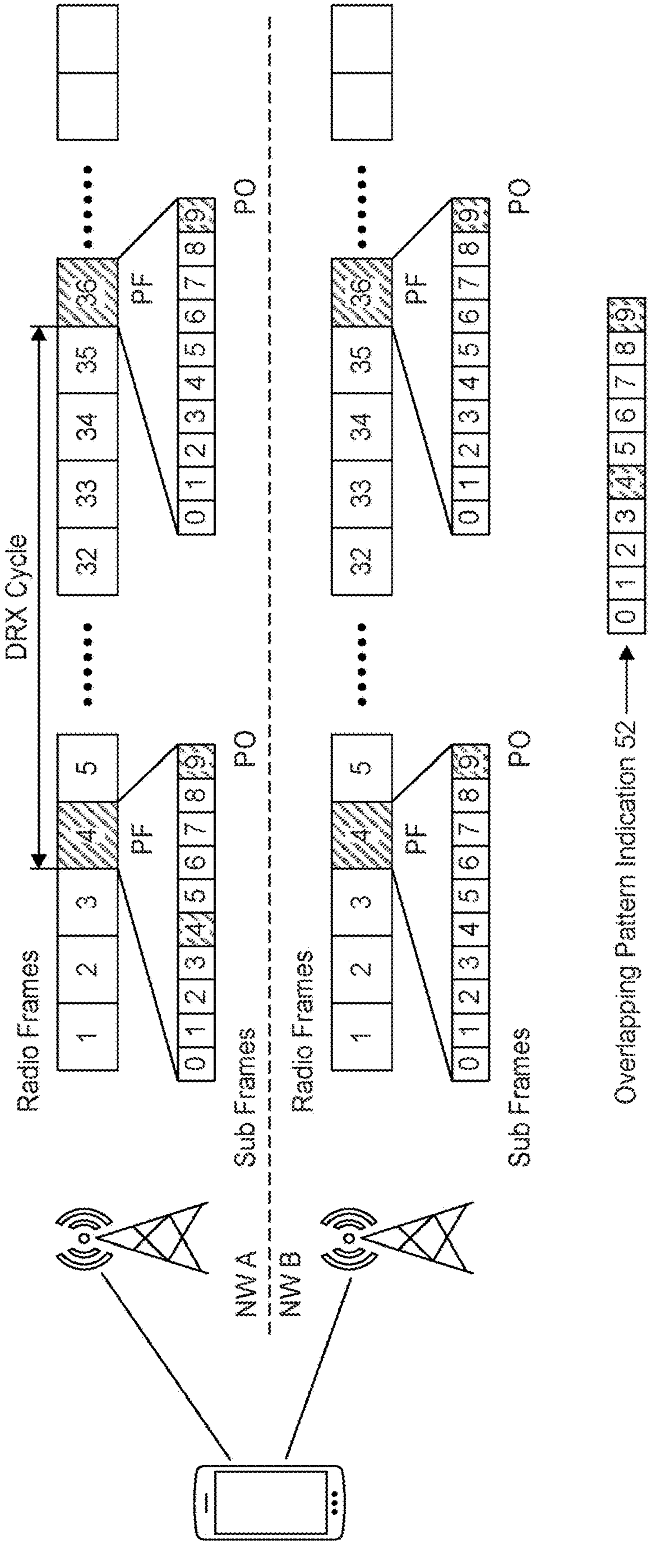
FIG. 5B is a diagram illustrating another example of paging occasion collision.

Turning to FIGS. 5A-5B, a paging occasion collision which may be prevented by the methods and WTRUs claimed in this application will now be discussed. Typically, many commercially deployed WTRUs may support multiple universal subscriber identity modules (USIMs). In other words, a WTRU may access two or more different radio networks at the same time. If the WTRU with multiple USIMs only supports single reception, also called single Receiver (Rx), the WTRU may only listen to one radio network at one time. For example, with respect to a WTRU having a single Rx, two or more networks (NW) (e.g., network A and network B shown in FIGS. 5A-5B) may separately allocate DRX cycle and WTRU ID and the WTRU may access, through the single Rx, the networks with different USIM applications hosted on either separate USIM or a single USIM. For the situation where the WTRU is equipped with two receivers and one transmitter (2 Rx/1TX), the WTRU may be able to listen to two paging occasions, but it may only be able to reply to one paging occasion, should they happen simultaneously. The WTRU may provide (e.g., as part of the WTRU capabilities) an indication of whether or not one or two transmitters are available.

FIGS. 5A-5B illustrate two examples of this paging occasion collision. As shown in FIG. 5A, the WTRU has two USIMs respectively corresponding to one of two networks, i.e., NW A and NW B. And the WTRU has only one receiver. The paging occasion respectively calculated by network A and network B may happen at exactly at the same time (i.e., radio frame 4 and subframe 9 shown in FIG. 5A). Therefore, a paging occasion collision occurs. Under this circumstance, no matter which network is chosen by the WTRU to listen upon waking up, the paging message in the other network (if transmitted) may be missed.

It should be noted that this paging occasion collision may not only happen in a scenario when the frame/subframe numbers for PF/PO in two networks are the same, as exemplarily shown in FIG. 5A, but also under other circumstances due to timing synchronization between cell in network A and cell in network B, even if the paging occasion in network A has a different frame number with the paging occasion in network B. It should also be noted that the above-discussed paging occasion collision may also occur in scenarios with multiple Subscriber Identity Modules (SIMs), and the methods and the WTRUs according to different embodiments disclosed in this application may also apply to those multi-SIM scenarios. In this application, unless otherwise indicated, a multi-USIM scenario will be taken as an example for the following description.

Therefore, if a Multi-USIM WTRU (i.e., a Single-Rx Multi-USIM WTRU) has only one receiver, it needs to monitor the paging in multiple networks using that receiver. When the WTRU is connected to the first network and in active service in the first network, it has to suspend or drop the service from time to time in order to synchronize with the second network to monitor the paging in that network. If the WTRU's paging cycle is short in the second network, it has to frequently switch back to the first network, thereby causing serious disruption to the ongoing service in the first network.

Another issue may exist with respect to a Single-Rx Multi-USIM WTRU. For example, a Single-Rx Multi-USIM WTRU has two USIM cards and decides to register both cards on the same Public Land Mobile Network (PLMN). Because the WTRU only supports a single reception (i.e., single Rx), the WTRU can only listen one radio network at one time. Regardless of being on one or two radio networks, the WTRU will have to listen to and decode two separate paging channels (or paging occasions). The reason for this is that the paging occasion for the WTRU is calculated based on one or more input parameters where the WTRU ID (or part of it) is one of the input parameters, and since the WTRU has two USIM cards, it will also have two separate unique IDs. As the WTRU decided to register to the same PLMN, it will most likely be served by only one core network entity (e.g. AMF). The WTRU would, therefore, constantly check the two channels in order to find out whether there is a MT service (Mobile Terminated service) for either of the two subscriptions. It would be a great optimization if the WTRU could only monitor "one" paging channel/occasion for services on both subscriptions.

There may be one or more embodiments that address the above-discussed issues existing with respect to a WTRU having multiple USIMs but a single receiver, such as the paging occasion collision. Similar techniques may be applicable to supporting more than two USIMs in the same or other scenarios. In this application, unless otherwise indicated, the present application will take a two-USIM scenario (i.e., two-network scenario) as an example to describe the methods and the WTRUs according to different embodiments in this application.

The methods and WTRUs according to different embodiments in this application will be described below with reference to FIG. 6A-6B and 7. In the following description, the two-network scenario which includes a first network and a second network, will be taken as an example to illustrate the embodiments of this application. The first network and the second network may be the two networks (i.e., NW A and NW B) shown in FIGS. 5A-5B. For example, the first network may be NW A shown in FIG. 5A, and the second network may be NW B shown in FIG. 5A. It should be noted that the above mentioned terms "first" and "second" are given for the purpose of differentiating the two networks, and those terms do not mean a network has a priority over the other. For example, the first network may be NW B shown in FIG. 5A, and the second network may be NW A shown in FIG. 5A. In the following description, unless otherwise indicated, NW A shown in FIG. 5A will be referred to as the first network, and NW B shown in FIG. 5A will be referred to as the second network.

In one embodiment, the first network and the second network may share the same wireless generation. For example, both the first network and the second network may be a 5G network or an LTE network. In another embodiment, the first network and the second network may not share the same wireless generation. For example, the first network may be a 5G network, and the second network may be an LTE network. It should be noted that the above exemplary descriptions of the two networks are only given by way of example, and they are not intended to be exclusive or be limiting to network scenarios where the methods and the WTRUs according to this application may be applied. For example, in a scenario, the first network may be a network based on a 3GPP wireless access, and the second network may be based on a non-3GPP wireless access.

The first embodiment in this application will be described in detail below with reference to FIGS. 6A-6B. FIG. 6A is a flow chart of a method 600 for use in a WTRU according to the first embodiment in this application. FIG. 6B is a diagram illustrating the method 600 in detail. In this embodiment, paging collision avoidance may be accomplished by the WTRU requesting a new WTRU ID. The WTRU may calculate paging occasions for both networks and it may determine whether a paging occasion collision will happen. When a paging occasion collision happens, the WTRU may request a new WTRU ID from one of the networks to generate a new paging occasion to avoid a paging occasion collision. Alternatively or additionally, the WTRU may provide a second network specific paging occasion that should not be used in this second network, by mapping the exact paging occasion of the first network onto the paging occasion of the second network and constructing an overlapping pattern indication. Alternatively, the WTRU may request a new DRX cycle instead of a new WTRU ID to avoid a paging occasion collision. The second network may take into account the overlapping pattern indication when calculating the new DRX cycle. All behaviors may be similar to the scenario where the WTRU requests a new WTRU ID.

Figure 6A:
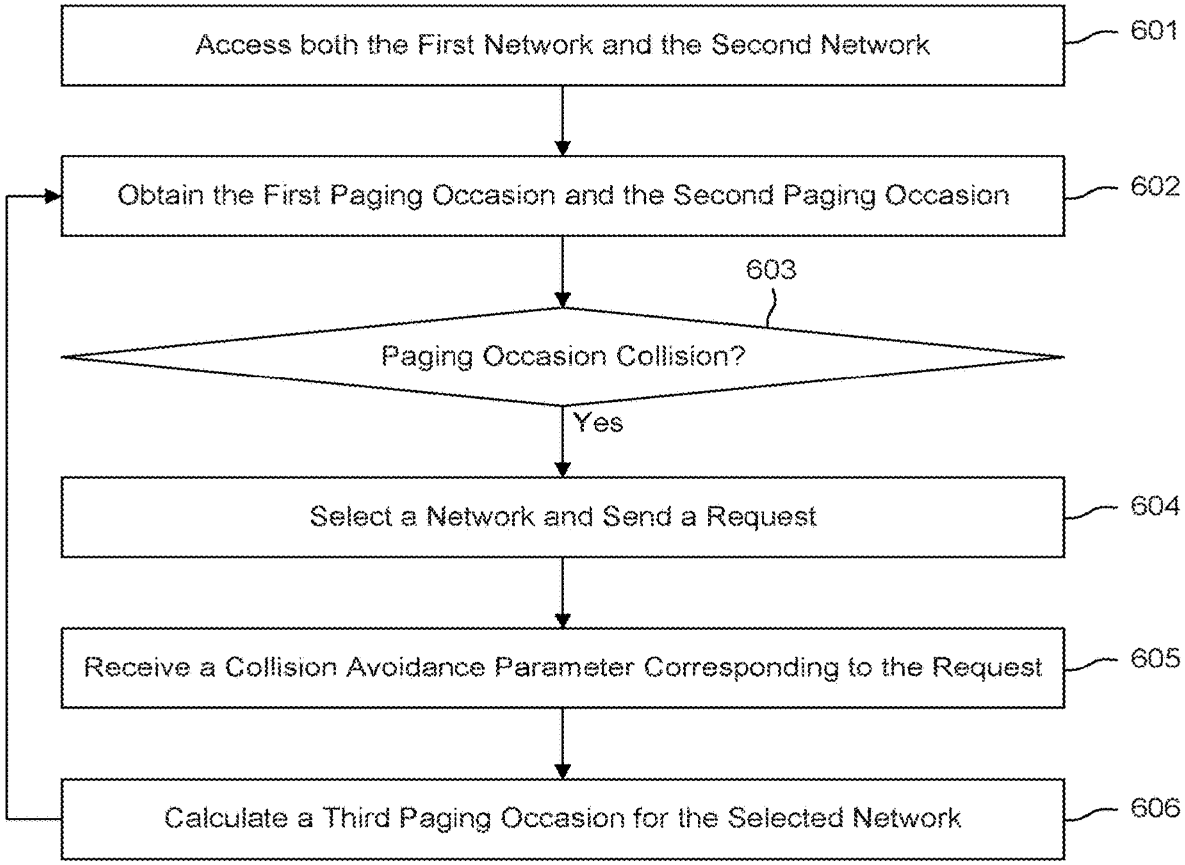
FIGS. 6A-6B illustrate a method for use in a WTRU according to the first embodiment in this application.
Figure 6B:
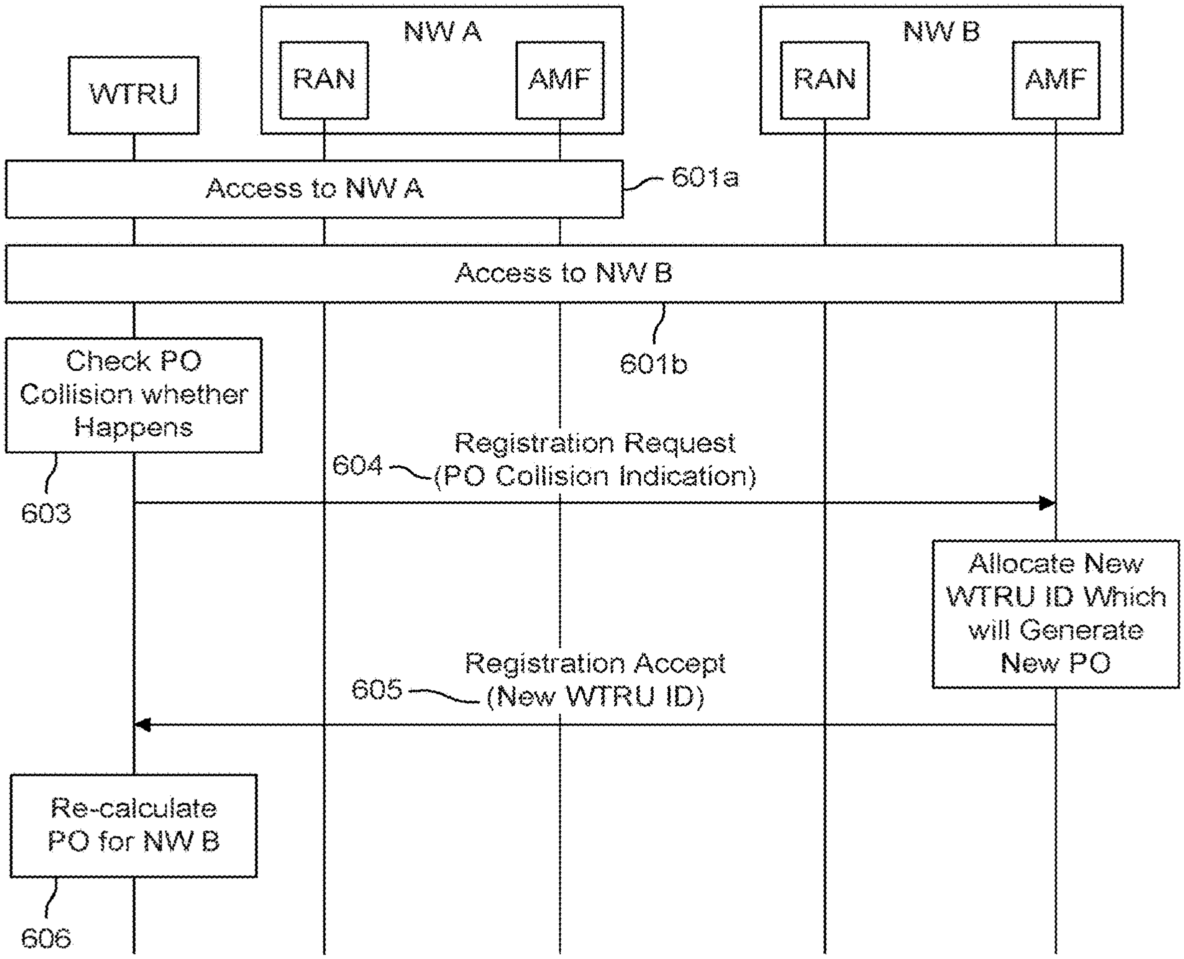

As shown in FIG. 6A, the method 600 comprises: at 601, accessing both the first network and the second network to receive radio frames from each of the first network and the second network; at 602, obtaining a first paging occasion as the first network's current paging occasion and a second paging occasion as the second network's current paging occasion; at 603, determining whether there is a paging occasion collision between the first paging occasion and the second paging occasion, on condition that there is the paging occasion collision, at 604, selecting a network from the first network and the second network, and sending a request to the selected network; at 605, receiving, from the selected network, a collision avoidance parameter corresponding to the request; and at 606, calculating a third paging occasion for the selected network using the collision avoidance parameter, and using the third paging occasion as the selected network's current paging occasion. It should be noted that after the WTRU gains access to the networks at 601, the processes at 602-606 may be performed in sequence and repeated. The processes 601-606 will be described below with reference to detailed embodiments.

Accordingly, the WTRU according to the first embodiment of this application may assess both the first network and the second network to receive radio frames from each of the first network and the second network. The WTRU may comprise a processor and a transceiver. The processor is configured to obtain a first paging occasion as the first network's current paging occasion and a second paging occasion as the second network's current paging occasion; and to determine whether there is a paging occasion collision between the first paging occasion and the second paging occasion, on condition that there is the paging occasion collision, the processor is further configured to select a network from the first network and the second network. The transceiver is configured to send a request to the selected network and receive, from the selected network, a collision avoidance parameter corresponding to the request. And the processor is further configured to calculate a third paging occasion for the selected network using the collision avoidance parameter and to use the third paging occasion as the selected network's current paging occasion. The WTRU as well as its processor and transceiver will be described below with reference to detailed embodiments.

Figure 7:
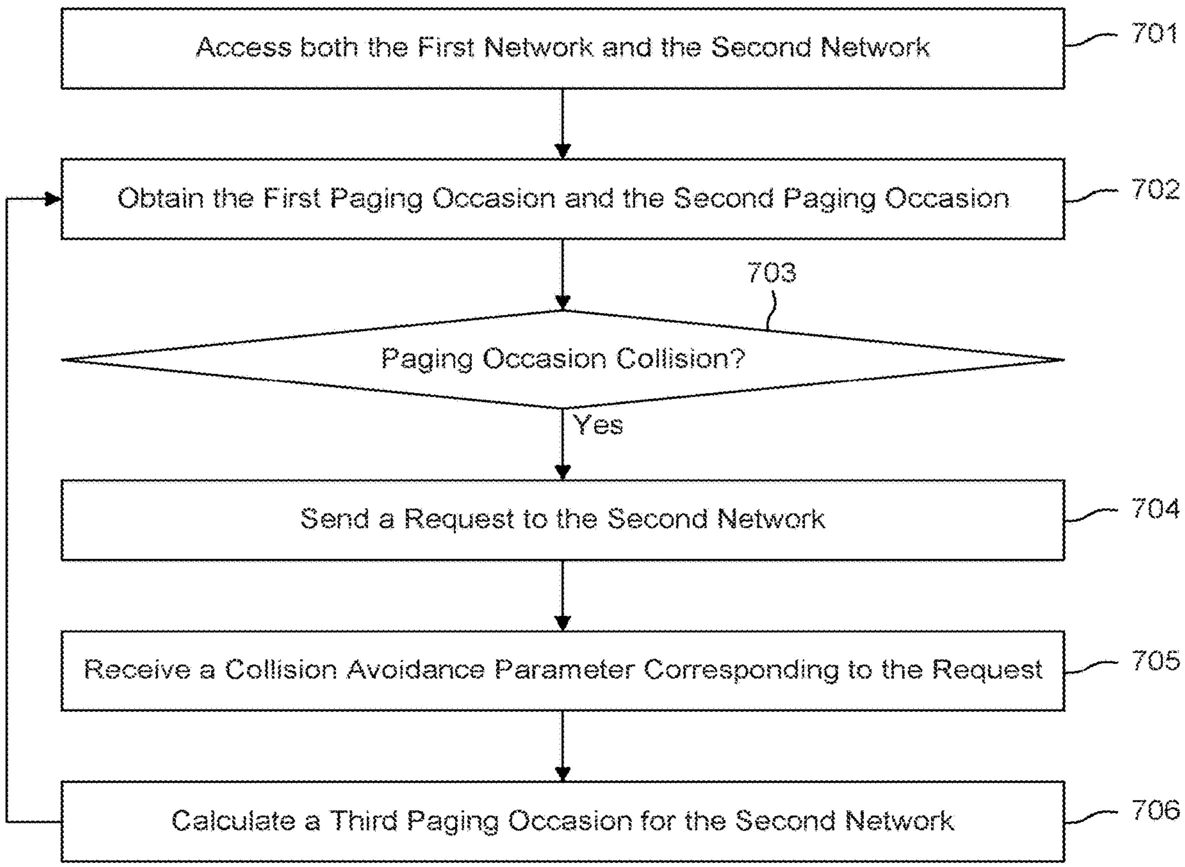
FIG. 7 is a diagram illustrating a method for use in a WTRU according to the second embodiment in this application.

The following description will describe the above-mentioned method 600 and the WTRU in detail with reference to FIGS. 6-7 as well as the above-discussed FIGS. 5A-5B.

As shown in FIG. 6A, at 601, the method 600 may comprise accessing both the first network and the second network to receive radio frames from each of the first network and the second network. In other words, at 601, the WTRU may access the first network to receive radio frames from the first network, and also access the second network to receive radio frames from the second network. To be more specific, as shown in FIG. 6B, the WTRU may access the first network (e.g., AMF of NW A) at 601*a*, and may access the second network (e.g., AMF of NW B) at 601*b*.

Those received radio frames may comprise paging frames and each of the paging frames may comprise at least one paging occasion where the WTRU may wake up. Therefore, the WTRU will not wake up in each and every radio frame. Again, paging frame and paging occasion may be calculated by the WTRU based on parameters and equations as discussed above. The following description will further describe such calculation in detail. There may be different known ways for the WTRU to gain access to the networks, and this application does not limit such ways of gaining access to the networks. Any available way to gain access to the networks may be used as long as it may help to realize the principle of this application.

Then, the method 600 proceeds to 602. As shown in FIG. 6A, at 602, the method 600 may comprise obtaining a first paging occasion for the first network as the first network's current paging occasion and a second paging occasion for the second network as the second network's current paging occasion. Accordingly, the processor may be further configured to obtain a first paging occasion for the first network as the first network's current paging occasion and a second paging occasion for the second network as the second network's current paging occasion.

Preferably, the first paging occasion and the second paging occasion may be obtained through calculation using parameters. To be more specific, in order to obtain the first paging occasion and the second paging occasion at 602, the method 600 may comprise: calculating the first paging occasion using a first parameter and calculating the second paging occasion using a second parameter.

The paging occasion in which the WTRU has to wake up may depend upon at least one of multiple parameters including WTRU ID, DRX cycle length, System Information Block (SIB), etc. The parameter(s) may be chosen according to different ways of calculating paging frame and paging occasion. Therefore, in some embodiments, the first parameter may only be a single parameter. For example, the first parameter may be WTRU ID. In other embodiments, the first parameter may comprise multiple sub-parameters. For example, the first parameter may comprise WTRU ID (first sub-parameter) and DRX cycle length (second sub-parameter). In a similar fashion, the second parameter may also be a single parameter or may comprise multiple sub-parameters. It should be noted that in this application, unless otherwise indicated, the terms "DRX cycle length" and "DRX cycle" may be used interchangeably.

In some embodiment, the first parameter may be the same as the second parameter. For example, each of the first and second parameters only includes WTRU ID, and further in the first parameter, the WTRU ID is 0, and in the second parameter, the WTRU ID is also 0. In that case, the calculated paging occasions (e.g., the first paging occasion and the second paging occasion described below) may be the same, thereby causing a paging occasion collision.

In some embodiments, the first parameter may be different from the second parameter. For example, the first parameter may be a single parameter, e.g., WTRU ID, while the second parameter may comprise multiple sub-parameters, e.g., WTRU ID and DRX cycle. Even if both the first parameter and the second parameter are a single parameter, e.g., WTRU ID, their parameter values may be different from each other. For example, the WTRU ID from the first parameter is 0, while the WTRU ID from the second parameter is 1. In that case, there may still be paging occasion collision because (1) the WTRU may use two different calculation methods, respectively for the two networks, which may ultimately lead to the same calculation result (i.e., the same paging occasion) and (2) the same calculation result may be obtained because different parameters play different roles in the calculation even if the same calculation method is used for the two networks.

The first and second parameters as well as their roles in paging occasion calculation will be further discussed below with reference to detailed embodiments. In the following description, unless otherwise indicated, it is assumed that multiple sub-parameters may be included in the first and second parameters.

In one case, the first and second parameters used for calculating paging occasion at 602 may be provided by the networks. For example, the first network may provide, e.g., through AMF of NW A shown in FIG. 6B, the first parameter to the WTRU to calculate paging frame and paging occasion for the first network, and the second network may provide, e.g., through AMF of NW B shown in FIG. 6B, the second parameter to the WTRU to calculate paging frame and paging occasion for the second network.

Preferably, the above-mentioned first and second parameters may not be provided by the networks, but pre-stored in the WTRU. In that case, once the WTRU receives radio frames from the networks, it will retrieve the first and second parameters and perform a calculation to obtain paging frames and paging occasions for the two networks respectively. The following description will further describe paging occasion calculation using those parameters in more detail.

In an embodiment, the first and second parameters used for calculating paging occasion may comprise the WTRU's identification (i.e., WTRU ID) and DRX cycle. In this embodiment, the WTRU may first determine radio frames (i.e., paging frames) in which it will wake up, and then further determine paging occasions within those paging frames. In other words, the method to calculate paging occasion can be divided into two parts: calculating paging frame and calculating paging occasion. To be more specific, paging frame may be calculated by the following equation (1):

$$\text{PF index}=(T/N)*(\text{WTRU\_ID} \bmod N) \quad (1)$$

Here, PF index represents the paging frame where the WTRU will wake up. T=DRX cycle in the radio frames. N=Min (T, nB). nB=Broadcast in System Information Block 2 (SIB 2).

Paging occasion may be calculated by the following equation (2):

$$i\_s=\text{floor}(\text{WTRU\_ID}/N) \bmod Ns \quad (2)$$

Here, Ns=Max (1, nB/T).T and nB share the same meaning as those in the equation (1). Once Ns and i_s are computed, the WTRU may create a table (e.g., Table 1 below) using Ns and i_s values. The intersection of i_s and Ns values in Table 1 shows in which subframes (i.e., paging occasions) the WTRU will wake up. It should be noted that the paging frame will occur based on the paging cycle. In other words, there is only one paging frame in each paging cycle.

TABLE 1

| | i_s = 0 | i_s = 1 | i_s = 2 | i_s = 3 |
|---|---|---|---|---|
| Ns = 1 | Subframe 9 | N/A | N/A | N/A |
| Ns = 2 | Subframe 4 | Subframe 9 | N/A | N/A |
| Ns = 4 | Subframe 0 | Subframe 4 | Subframe 5 | Subframe 9 |

It should also be noted that the above Table 1 is only an example assuming the following parameters for the WTRU: WTRU ID=0, T=64 and nB=128. Table 1 as well as its shown paging occasions may vary based on different value of the above-mentioned parameters. It should also be noted that the above example and equations of calculating the paging frame and the paging occasion are also given by way of example, and they are not intended to be exclusive or be limiting to the present application. Different calculation methods as well as equations may be used as long as they can help to realize the general principle of this present application.

The first paging occasion corresponds to the paging occasion available for the first network, and the second paging occasion corresponds to the paging occasion available for the second network. As shown in FIG. 5A, by using the above-discussed equation (1), equation (2) and Table 1, the WTRU may obtain the first paging occasion, i.e., subframe 9 in radio frame 4. In a similar fashion, the WTRU may obtain the second paging occasion, i.e., subframe 9 in radio frame 4. Once the first paging occasion is obtained, the WTRU will use the first paging occasion as the first network's current paging occasion. Similarly, once the second paging occasion is obtained, the WTRU will use the second paging occasion as the second network's current paging occasion.

The above description discussed how to obtain paging occasion by calculation using parameters. In some embodiments, paging occasion may be obtained without calculation. For example, the first paging occasion (e.g., the last subframe in odd radio frame) and the second paging occasion (e.g., the last subframe in odd radio frame) may be pre-stored in the WTRU. In other words, the WTRU may know when to wake up to receive paging information without calculating the paging occasion for each network. In that case, once the WTRU receives radio frames from the two networks respectively, it will retrieve the pre-stored paging occasions, and use them as the current paging occasions for the networks respectively.

It should be noted that the above examples about how to obtain the first paging occasion and the second paging occasion are only given by way of example, and they are not intended to be exclusive or be limiting to the present application. Those paging occasions may be obtained through any available way as long as they may be helpful to realize the general principle of the present application.

Then the method 600 proceeds to 603. At 603, the method 600 comprises determining whether there is paging occasion collision between the first paging occasion and the second paging occasion. Accordingly, the processor is further configured to determine whether there is a paging occasion collision between the first paging occasion and the second paging occasion. As shown in FIG. 6B, the WTRU may determine whether a paging occasion happens or not at 603.

In some embodiments, the paging occasion collision may occur if the paging occasions for the two networks are the same. For example, as shown in FIG. 5A, the paging occasion for NW A is subframe 9 in radio frame 4, and the paging occasion for NW B is also subframe 9 in radio frame 4. Therefore, in this scenario, the paging occasion collision occurs. It should be appreciated that the above description with reference to FIG. 5A about the paging occasion collision is only given by way of example, and it's not intended to be exclusive or be limiting to the present application. The paging occasions for the two networks may occur in any radio frame and any subframe within such radio frame as long as the paging occasions are the same as each other. For example, the paging occasion collision may occur if the paging occasions for both networks are subframe 1 in radio frame 2.

In some embodiments, the paging occasion collision may occur if the paging occasions for the two networks share at least one paging occasion. That is, after the calculation discussed above at 602, there may be two or more paging occasions in a paging frame for a network, and the paging occasion collision may occur if at least one of paging occasions from one of the networks is the same as one of paging occasions from the other network. For example, as shown in FIG. 5B, the paging occasion for NW A is subframes 4 and 9 in radio frame 4, and the paging occasion for NW B is subframe 9 in radio frame 4. In that case, the paging occasion collision occurs at subframe 9 in radio frame 4.

In some embodiments, the paging occasion collision may occur even if the two networks do not share the same paging frame or the same paging occasion. For example, due to timing synchronization between cell in NW A and cell in NW B, paging occasion in NW A may be subframe 1 in radio frame 1, and paging occasion in NW B may be subframe 2 in radio 2. And, because (1) DRX cycle for NW A is different from that for NW B, and/or (2) total number of subframes in a radio frame from NW A is different from that from NW B, subframe 1 in radio frame 1 for NW A may occur at the same time as subframe 2 in radio 2 for NW B. In that case, a paging occasion collision occurs.

The above description provided different embodiments regarding the paging occasion collision to which the present application may be directed. It should be appreciated that these embodiments are only given by way of example, and they are not intended to be exclusive or be limiting to the present application. A paging occasion collision to which this application may be applied may occur in other scenarios as long as those scenarios are consistent with the general principle of this application.

Then, on condition that there is the paging occasion collision, the method 600 may proceed to 604. At 604, the method 600 may comprise selecting a network from the first network and the second network, and sending a request to the selected network. Accordingly, on condition that there is the paging occasion, the processor may be further configured to select a network from the first network and the second network, and the transceiver may be configured to send the request to the selected network. To be more specific, as shown in FIG. 6B, at 604, the WTRU may select NW B and send a Registration Request including a paging occasion collision indication (e.g., an overlapping pattern indication) to the AMF of NW B. Accordingly, the AMF of NW B may receive the request.

Preferably, the network selected at 604 may be any one of the two networks. In other words, the processor may randomly select a network from the networks. For example, as shown in FIG. 5A, the WTRU may select NW A and send the request to NW A. Alternatively, the WTRU may select NW B and send the request to NW B. It should be noted that the request may be sent to an AMF of the selected network. For example, as shown in FIG. 6B, the request (i.e., the registration request shown in FIG. 6B) is sent to the AMF of the selected network, i.e., NW B.

The WTRU may select a network which may support this request (e.g., the registration request shown in FIG. 6B) sent from the WTRU. For example, the WTRU may determine whether NW A and/or NW B may support this request during an access procedure (e.g., 601*a* and 601*b*) or a former registration procedure. If the WTRU determines that only one of the networks (e.g., NW A) supports this request, then it may send the request to NW A. If the WTRU determines that both networks support this request, then it may send the request to any of the networks.

Preferably, the network may be selected based on an operator policy or a power optimization preference of the WTRU. In other words, the processor may select a network from the two networks based on an operator policy or a power optimization preference of the WTRU.

In some embodiments, the operation policy may indicate that the second network (e.g., NW B shown in FIGS. 5A-5B) will be selected once there is a paging occasion collision between the first network and the second network.

In other embodiments, the operation policy may indicate that the network which has the fewest paging occasions within a paging frame may be selected. For example, if there are two paging occasions in a paging frame for the first network, and there is only one paging occasion in a paging frame for the second network, then according to the operation policy, the second network will be selected. As shown in FIG. 5B, there are two paging occasions in the paging frame for NW A, while there is only one paging occasions in the paging frame for NW B. Therefore, in the scenario shown in FIG. 5B, NW B will be selected.

Preferably, the operator policy may be a policy pre-stored in the WTRU regarding the network selection. The operator policy may also be provided by the networks (e.g., by AMFs). It should be appreciated that above examples of the operation policy are only given by way of example, and they are not intended to be exclusive or be limiting in how to select a network from the possible networks.

The WTRU's power optimization preference may indicate that the WTRU may select a network which may consume less energy of the WTRU due to periodically waking up the WTRU. Preferably, the WTRU's power optimization preference may depend on one or multiple factors, such as the length of a DRX cycle, the number of paging occasions in a paging frame, etc. For example, the WTRU's power optimization preference may depend on the length of a DRX cycle, and the longer the DRX cycle, the less energy consumption for waking up the WTRU. Therefore, in this example, the WTRU's power optimization preference indicates that a network which has a longer DRX cycle will be selected. Similarly, in a scenario where there are more than two networks, the WTRU's power optimization preference may indicate that a network which has the longest DRX cycle will be selected.

Preferably, the WTRU's power optimization preference may be a preference pre-stored in the WTRU regarding the network selection. The WTRU's power optimization preference may also be provided by the networks (e.g., by AMFs). It should be appreciated that above examples of the power optimization preference are only given by way of example, and they are not intended to be exclusive or be limiting in how to select a network from the possible networks.

The above description discussed some embodiments regarding network selection at 604, and it should be appreciated that these embodiments may be varied based on the general principle of the present application. Therefore, any available variants of the above embodiments should fall into the scope of the present application as long as those variants are consistent with the general principle of the present application.

The request sent to the selected network may be used to inform of the network that there is a paging occasion collision and let the selected network generate a parameter needed in those processes following the process at 604. The request may be sent to the selected network through frames or signals that may be available to carry the request. The request may be used to request the selected network (e.g., its AMF) to generate a new parameter or new parameters, such as a new WTRU ID or a new DRX cycle, for the WTRU to calculate and obtain, for the selected network, a new paging occasion which will not collide with the paging occasion for the unselected network. Here in this application, the new parameter(s) generated by the selected network is referred to as collision avoidance parameter. The following description will further describe the collision avoidance parameter in more detail.

Preferably, the request may comprise an overlapping pattern indication indicating that the first paging occasion and the second paging occasion are overlapping. Generally speaking, this overlapping pattern indication may include an indication of when the paging occasions are overlapping, thereby enabling the network to either page again or wait for the WTRU reply (i.e., Service Request shown in FIG. 3) within a set time. The set time for reply may be defined or tracked by a timer or number of paging retransmissions.

In some embodiments, the overlapping pattern indication may be an indication which indicates the subframe(s) where the paging occasion collision occurs. In other words, the overlapping pattern indication may indicate when the first paging occasion and the second paging occasion are overlapping. In other embodiments, the overlapping pattern indication may be a map which is created by mapping the paging occasion of the first network onto the paging occasions of the second network or by mapping the paging occasion of the second network onto the paging occasions of the first network. The overlapping pattern indication may be used by the selected network to generate the collision avoidance parameter (described later). The overlapping pattern indication will be further described below with reference to detailed examples.

In the example shown in FIG. 5A, there is a paging occasion collision at subframe 9 in radio frame 4, and it is assumed that the second network (i.e., NW B) is selected at 604. In this example, the overlapping pattern indication 51 (shown in FIG. 5A) comprised in the request may indicate that the first paging occasion and the second paging occasion collides with each other at subframe 9 in radio frame 4.

In the example shown in FIG. 5B, there is a paging occasion collision at sbuframe 9 in radio frame 4 and it is also assumed that the second network (i.e., NW B) is selected at 604. In this example, the overlapping pattern indication comprised in the request may be a map shown as overlapping pattern indication 52 in FIG. 5B. The overlapping pattern indication 52 is created by mapping the first paging occasion onto the second paging occasion. It can be seen that the overlapping pattern indication 52 not only indicates the paging frame (i.e., radio frame 4) and the paging occasion (i.e., subframe 9) where the collision occurs, but also shows a paging occasion (i.e., subframe 4) where no collision occurs. Therefore, NW B (e.g., the AMF of NW B) may generate a collision avoidance parameter to be used by the WTRU to generate a new paging occasion that is different from subframes 4 and 9, thereby preventing a paging occasion collision from occurring.

It should be appreciated that the above examples of the requests and the overlapping pattern indications are only given by way of example, and they are not intended to be exclusive or be limiting to the request and the overlapping pattern indication available for this application. Any variants of the above examples should fall into the scope of the present application as long as those variants are consistent with the general principle of the present application.

Further, using the overlapping pattern indication provided by the WTRU, the selected network may buffer Down Link Data, based on the overlapping pattern indication, in those cases where the WTRU is unable to reply to a page due to overlapping paging occasions.

Additionally, for those cases where the WTRU is equipped with only one receiver and one transmitter, the overlapping pattern indication signals the network the paging occasions where the WTRU may not be able to receive paging information. The network may then use this indication to determine whether to retransmit the paging information.

Further, the network (e.g., the AMF of NW B) may calculate a collision avoidance parameter (e.g., a new WTRU ID) based on the request transmitted from the WTRU and then allocate the collision avoidance parameter to the WTRU to ensure a different paging occasion will be used by the WTRU for the purpose of preventing paging occasion collision. For example, the AMF of NW B may determine a new WTRU ID based on a local algorithm to ensure a new paging occasion obtained from the new WTRU ID is different from that paging occasion (i.e., subframe 9 shown in FIG. 5A) obtained from the existing WTRU ID. Then, the AMF in NW B sends a Registration Accept message which includes new WTRU ID to the WTRU.

Then, the method 600 proceeds to 605. At 605, the method 600 may comprise receiving, from the selected network, the collision avoidance parameter corresponding to the request. Accordingly, the transceiver is further configured to receive, from the selected network, the collision avoidance parameter corresponding to the request. As shown in FIG. 6B, at 605, the AMF of NW B transmits a Registration Accept comprising the collision avoidance parameter (e.g., a new WTRU ID) to the WTRU.

Preferably, the collision avoidance parameter received from the selected network may be different from the parameter (e.g., the first parameter or the second parameter) used to calculate the paging occasion for the selected network. To be more specific, if the selected network is the first network, then the collision avoidance parameter is different from the first parameter used to calculate the first paging occasion, and if the selected network is the second network, then the collision avoidance parameter is different from the second parameter used to calculate the second paging occasion. For example, if there is a paging occasion collision as shown in FIG. 5A and the selected network is the second network (e.g., NW B), then the collision avoidance parameter which is different from the second parameter may be used to calculate a new paging occasion (e.g., the third paging occasion described later) to replace the second paging occasion, thereby obtaining the new paging occasion which will not collide with the first paging occasion. Therefore, the original paging occasion collision between the first and second networks can be avoided.

Preferably, the collision avoidance parameter is different from the parameter used to calculate the current paging occasion for the selected network because they have the same kind of parameter but different values. In some embodiments, the collision avoidance parameter may comprise a WTRU ID which is different from the WTRU ID in the parameter used to calculate the current paging occasion for the selected network. For example, the selected network is the second network and the WTRU ID in the second parameter is 0, the WTRU ID in the collision avoidance parameter is 1. In some embodiments, the collision avoidance parameter may comprise a DRX cycle which is different from the DRX cycle in the parameter used to calculate the current paging occasion for the selected network. For example, the selected network is the first network and the DRX cycle in the first parameter is 128, the DRX cycle in the collision avoidance parameter is 256. In some embodiments, the selected network is the second network and the second parameter comprises both WTRU ID (e.g., WTRU ID=0) and DRX cycle (e.g., 128), and the collision avoidance parameter comprises a different WTRU ID (e.g., WTRU ID=1) and a different DRX cycle (e.g., 256), and thus the collision avoidance parameter is different from the second parameter.

Preferably, the collision avoidance parameter is different from the parameter used to calculate the current paging occasion for the selected network because the networks do not necessarily use the same type of parameter. In some embodiments, the collision avoidance parameter may comprise both WTRU ID and DRX cycle, while the first parameter (if the first network is the selected network) may only comprise WTRU ID.

It should be noted that the above example of the collision avoidance parameters are only given by way of example, and they are not intended to be exclusive or be limiting to the parameters available to calculate a new paging occasion different from that paging occasion for the selected network. Further, the above-mentioned terms "WTRU ID" and "DRX cycle" refer to their values respectively. For example, when describing that the DRX cycle is 256, it means that the value of the DRX cycle is 256.

Then, the method 600 proceeds to 606. At 606, the method 600 comprises calculating a third paging occasion for the selected network using the collision avoidance parameter, and using the third paging occasion as the selected network's current paging occasion.

The third paging occasion may be calculated through the above-discussed equation (1), equation (2) and Table 1. Since the collision avoidance parameter is a new parameter which is different from the parameter used to calculate the current paging occasion for the selected network, after the calculation through the equation (1), equation (2) and Table 1, the newly obtained paging occasion, i.e., the third paging occasion, is different from the previous paging occasion of the selected network. For example, if there is a paging occasion collision between the first paging occasion and the second paging occasion and the selected network is the second network, then the third paging occasion (e.g., subframe 5 shown in FIG. 5A) obtained at 606 is different from the second paging occasion (e.g., subframe 9 shown in FIG. 5A) which collides with the first paging occasion (e.g., subframe 9 shown in FIG. 5A). Thus, there may be no paging occasion collision between the third paging occasion and the first paging occasion. Then, using the third paging occasion, instead of the second paging occasion, as the current paging occasion for the second network may avoid the original paging occasion collision between the first network and the second network.

Turning to FIG. 5B for another example, as above discussed, the overlapping pattern indication 52 may be used to generate the collision avoidance parameter, and thus, the new paging occasion (i.e., the third paging occasion) calculated and obtained from the collision avoidance parameter will be different from those paging occasions shown by the overlapping pattern indication 52. For example, the third paging occasion may be subframe 6 which will be used to replace the second paging occasion (subframe 9) for NW B. Therefore, there will be no paging occasion collision.

In the above embodiments, two networks are discussed. These networks correspond to two USIMs (e.g., dual-USIM) within a WTRU. In other words, the WTRU may access one network through one USIM, and may access another network through another USIM. It should be appreciated that this two-network scenario is not the only desired scenario where the present application is directed to. In another desired scenario, a WTRU may have three or more USIMs, each of which may access its own network respectively. That is, the present application does not limit the number of USIMs or the number of networks.

The second embodiment in this application will be described in detail below with reference to FIG. 7. FIG. 7 is a flow chart of a method 700 for use in a WTRU according to the second embodiment in this application.

As shown in FIG. 7, the method 700 may comprise: at 701, accessing both the first network and the second network to receive radio frames from each of the first network and the second network; at 702, obtaining a first paging occasion as the first network's current paging occasion and a second paging occasion as the second network's current paging occasion; at 703, determining whether there is a paging occasion collision between the first paging occasion and the second paging occasion, on condition that there is the paging occasion collision, at 704, sending a request to the second network; at 705, receiving, from the second network, a collision avoidance parameter corresponding to the request; and at 706, calculating a third paging occasion for the second network using the collision avoidance parameter, and using the third paging occasion as the second network's current paging occasion. It should be noted that after the WTRU gains access to the networks at 701, the processes at 702-706 may be performed in sequence and repeated.

In a second embodiment, the WTRU may assess both the first network and the second network to receive radio frames from each of the first network and the second network. The WTRU comprises a processor and a transceiver. The processor is configured to obtain a first paging occasion as the first network's current paging occasion and a second paging occasion as the second network's current paging occasion; and to determine whether there is a paging occasion collision between the first paging occasion and the second paging occasion, on condition that there is the paging occasion collision, the transceiver is configured to send a request to the second network and receive, from the second network, a collision avoidance parameter corresponding to the request. And the processor is further configured to calculate a third paging occasion for the second network using the collision avoidance parameter and use the third paging occasion as the second network's current paging occasion.

It could be appreciated that most processes in the method 700 may be the same as or similar to those in the method 600. It should be noted that in the method 700, there is no need to select a network which will receive the request. In other words, once a paging occasion collision occurs, the second network will be considered as the "selected network" automatically, and thus the WTRU will send the request to the second network (e.g., the AMF of NW B shown in FIG. 5A). Accordingly, at 706, the WTRU calculates the third paging occasion for the second network, and uses the third paging occasion to replace the second paging occasion (i.e., the third paging occasion is the current paging occasion of the second network). Since the other processes in the method 700 may be the same as or similar to those in the above method 600, those processes may be referred to the above first embodiment and here a detailed description of those processes will be omitted.

It also should be noted that in the above-discussed method 700, at 704, WTRU may send the request to the first network rather than the second network. In other words, the first network will be considered as the "selected network" automatically once there is a paging occasion collision. Subsequently, the WTRU may receive the collision avoidance parameter from the first network and generate a third paging occasion for the first network to replace the first paging occasion. Therefore, the original paging occasion collision between the first paging occasion and the second paging occasion will be prevented.

Figure 8:
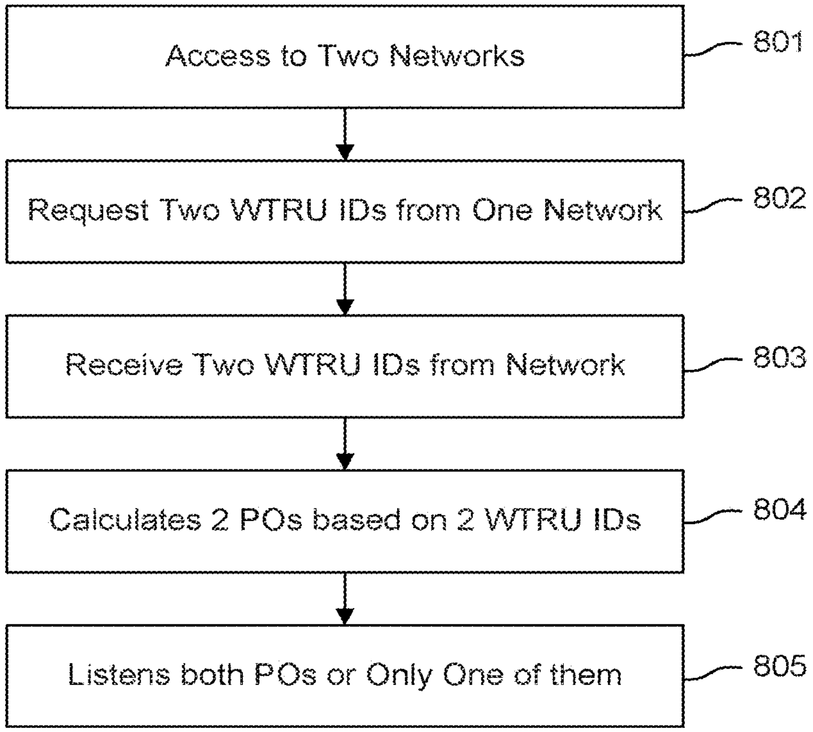
FIG. 8 is a flowchart generally illustrating a method for use in a WTRU according to the third embodiment in this application.

The third embodiment in this application will be described in detail below with reference to FIGS. 8-9. FIG. 8 is a flowchart generally illustrating a method 800 for use in a WTRU according to the third embodiment in this application.

In the third embodiment, paging occasion collision avoidance may be accomplished by the WTRU requesting two WTRU IDs from one network. The WTRU may request two WTRU IDs when the WTRU registers to one network (e.g., by indicating Dual SIM supported). The WTRU may calculate two paging occasions for this network based on two WTRU IDs. The WTRU may listen at both paging occasions in this network or only listen at one of the paging occasions that is not conflicted with the paging occasion in the other network. The network may perform paging in both paging occasions. The above-mentioned general principle of the third embodiment will be described in detail below. Again, the third embodiment will be discussed within the same two-network scenario as discussed above in the first and second embodiments.

As shown in FIG. 8, the method 800 may comprise the following processes: at 801, accessing both the first network and the second network to receive radio frames from each of the first network and the second network; at 802, requesting two WTRU IDs when the WTRU registers to one of the networks (e.g., NW B); at 803, receiving two WTRU IDs from the network; at 804, calculating two paging occasions for the network based on the two WTRU IDs; at 805, listening at both paging occasions in this network (e.g., NW B) or listen at only one of the paging occasions that is not conflicted with the paging occasion in the other network (e.g., NW A).

The process at 801 may be the same as or similar to the process at 601 discussed above. Here, a detail description of the process at 801 is omitted. At 802, in one embodiment, the WTRU may send a request to one of the networks, e.g., NW B, by indicating Dual SIM supported by the WTRU. In another embodiment, the WTRU may send a general request to let NW B know that the WTRU needs two WTRU IDs. It should be noted that other kinds of request or information may be used by the WTRU at 802 as long as that request or information may help to realize the principle of the third embodiment in this application.

At 803, the WTRU may receive two WTRU IDs from the network which received the request transmitted at 802. The process at 803 may be the same as or similar to the process at 605 discussed above. A detailed description of the process at 803 is omitted here. At 804, the WTRU may calculate two paging occasions for the network based on the two WTRU IDs. The calculation method used at 804 may be the same or similar to those calculation methods discussed above in the first embodiment.

At 805, the WTRU may listen at both paging occasions in this network (e.g., NW B) or only listen at one of the paging occasions that is not conflicted with the paging occasion in the other network (e.g., NW A). For example, it is assumed that at 802, the WTRU sends a request to NW B, and accordingly, after the processes at 803 and 804, the WTRU obtains two paging occasions for NW B, and the two paging occasions are subframe 4 and subframe 9 shown in FIG. 5B. Therefore, in one scenario, the WTRU may first listen at both paging occasions in NW B. Then, the WTRU may figure out that there is a paging occasion collision with NW A at subframe 9. Then, the WTRU may shift to listen for NW B at the subframe 4 only. In another scenario, the WTRU may first listen at both paging occasions in NW B. Then, the WTRU may figure out that there is no paging occasion collision at either of the two paging occasions. Then, the WTRU may choose to keep listening at both paging occasions in NW B, or only listen at anyone of the paging occasions.

Figure 9:
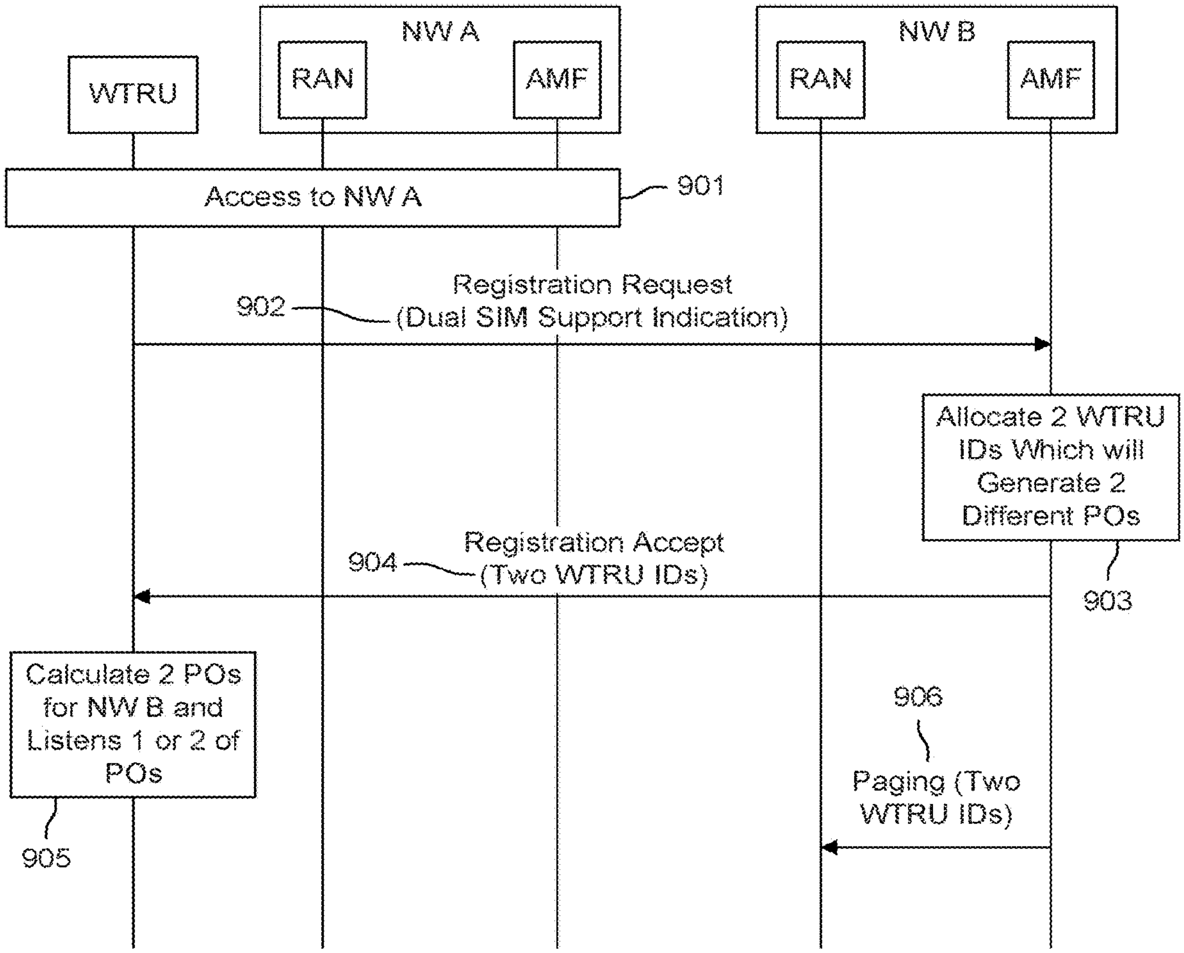
FIG. 9 illustrates the method shown in FIG. 8 in more detail.

Now turning to FIG. 9 to further describe the method according to the above-discussed third embodiment. FIG. 9 illustrates processes from the WTRU and its related processes from networks. As shown in FIG. 9, the method 900 may comprise: at 901, the WTRU may access one of the two networks (e.g., NW A); at 902, the WTRU may access another network of the two networks (e.g., NW B), and request two WTRU IDs (e.g., send a Registration Request with Dual SIM support indication); at 903, the AMF of the network may receive the request from the WTRU and the AMF may determine the two WTRU IDs based on a local algorithm to ensure the paging occasions calculated with these two WTRU IDs are different from each other, and then the AMF may allocate two WTRU IDs to the WTRU (e.g., the AMF in NW B may send Registration Accept message which includes two WTRU IDs); at 904, the AMF may send the two WTRU IDs to the WTRU; at 905, the WTRU may calculate and obtain two paging occasions using the two WTRU IDs respectively, and the WTRU may listen at both paging occasions in NW B or only listen at one of them which has no collision with the paging occasion in NW A; and at 906, the AMF may send paging message and the AMF may include two WTRU IDs in the paging message or send two separate paging messages for each WTRU ID (accordingly, the RAN of NW B may perform paging at both paging occasions corresponding to both WTRU IDs). The processes from 901 to 906 may be the same as or similar to corresponding processes discussed above in the first and third embodiment. Therefore, a detail description of the method 900 is omitted here.

Figure 10:
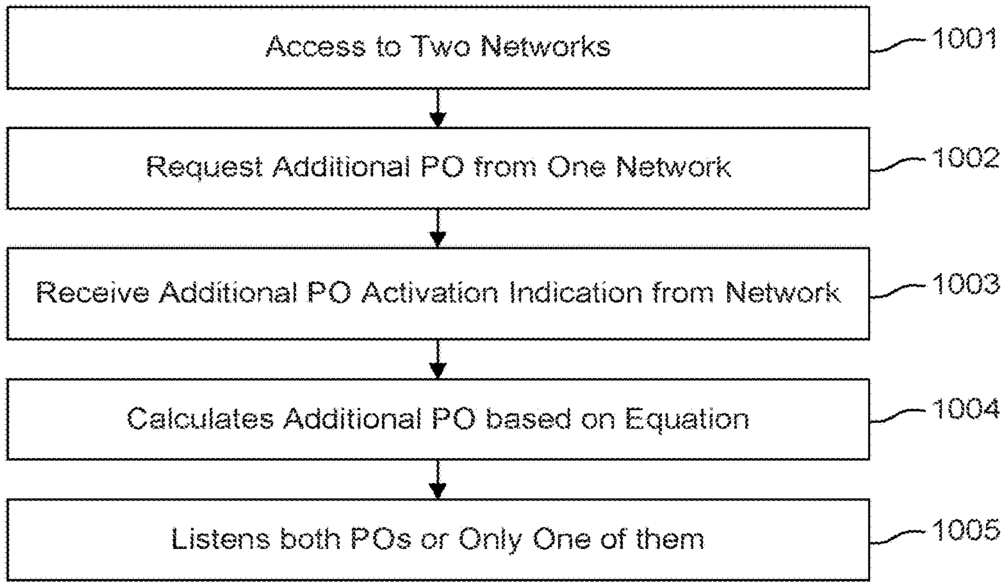
FIG. 10 is a flowchart generally illustrating a method for use in a WTRU according to the fourth embodiment in this application.

The fourth embodiment in this application will be described in detail below with reference to FIGS. 10-11. FIG. 10 is a flowchart generally illustrating a method 1000 for use in a WTRU according to the fourth embodiment in this application.

In the fourth embodiment, paging occasion collision avoidance may be performed by the activation of additional paging occasions. The WTRU may request additional paging occasion(s) when the WTRU registers to one network (e.g., by indicating that Dual SIM is supported). Once the WTRU receives an additional paging occasion activation indication, it may calculate additional paging occasion(s) for this network based on an additional paging occasion equation. The WTRU may listen at both paging occasions in this network or only listen to one of the paging occasions which is not conflicted with paging occasion in the other network. The network may perform paging at both paging occasions. The above-mentioned general principle of the fourth embodiment will be described in detail below. Again, the fourth embodiment will be discussed within the same two-network scenario as discussed above in the first and second embodiments.

The additional paging occasion equation may be an equation based on the above-discussed equation (2). For example, the additional paging occasion equation may be the following equation (3):

$$i\_s=(\text{floor }(UE\_ID/N)\bmod Ns)+\text{offset} \quad (3)$$

The equation (3) may be considered to be an equation obtained by adding a value (i.e., offset) into the above equation (2). Since the equation (3) is similar to the equation (2), those parameters used in the equation (3) could be referred to the above description and here a detailed description of the equation (3) is omitted. It should be noted that this equation (3) is only given as an example and it does not represent a limitation to the form of the equation.

As shown in FIG. 10, the method 1000 may comprise the following processes: at 1001, accessing both the first network and the second network to receive radio frames from each of the first network and the second network; at 1002, requesting additional paging occasion when the WTRU registers to one of two networks (e.g., by indicating Dual SIM is supported); at 1003, receiving additional paging occasion activation indication (e.g., Dual SIM activated) from the network; at 1004, calculating additional paging occasion based on additional paging occasion equation; and at 1005, listen at both paging occasions in this network or listen at only one of the paging occasions that is not conflicted with the paging occasion in the other network.

The process at 1001 may be the same as or similar to the process at 601 discussed above. Here, a detail description of the process at 1001 is omitted. At 1002, in one embodiment, the WTRU may send a request to one of the networks, e.g., NW B, by indicating Dual SIM supported by the WTRU, in order to request additional paging occasion. In another embodiment, the WTRU may send a general request to let NW B know that the WTRU needs additional paging occasion. It should be noted that other kinds of request or information may be used by the WTRU at 1002 as long as that request or information may help to realize the principle of the fourth embodiment in this application.

At 1003, the WTRU may receive additional paging occasion activation indication (e.g., Dual SIM activated) from the network. The additional paging occasion activation indication may authorize the WTRU to calculate additional paging occasion based on the additional paging occasion equation.

At 1004, the WTRU may calculate an additional paging occasion based on the additional paging occasion equation, e.g., the above equation (3). The process at 1005 is the same as or similar to the process at 805 discussed above. Here, a detail description of the process at 1005 is omitted.

Accordingly, the AMF of the network which received the request may performe the following processes: receiving additional paging occasion request from the WTRU (e.g., Registration Request with Dual SIM supported indication); indicating additional paging occasion is activated or transmitting an additional paging occasion activation indication (e.g., including Dual SIM activated indication in Registration Accept); and/or, when sending paging message to the RAN, the AMF may indicate additional paging occasion is activated. The above-mentioned processes performed by the AMF will further be discussed below with reference to FIG. 11.

Accordingly, the RAN of the network may perform the following processes in this embodiment: receiving additional paging occasion activation indication from the AMF; and calculating both paging occasions and additional paging occasion; perform paging at both paging occasions.

Figure 11:
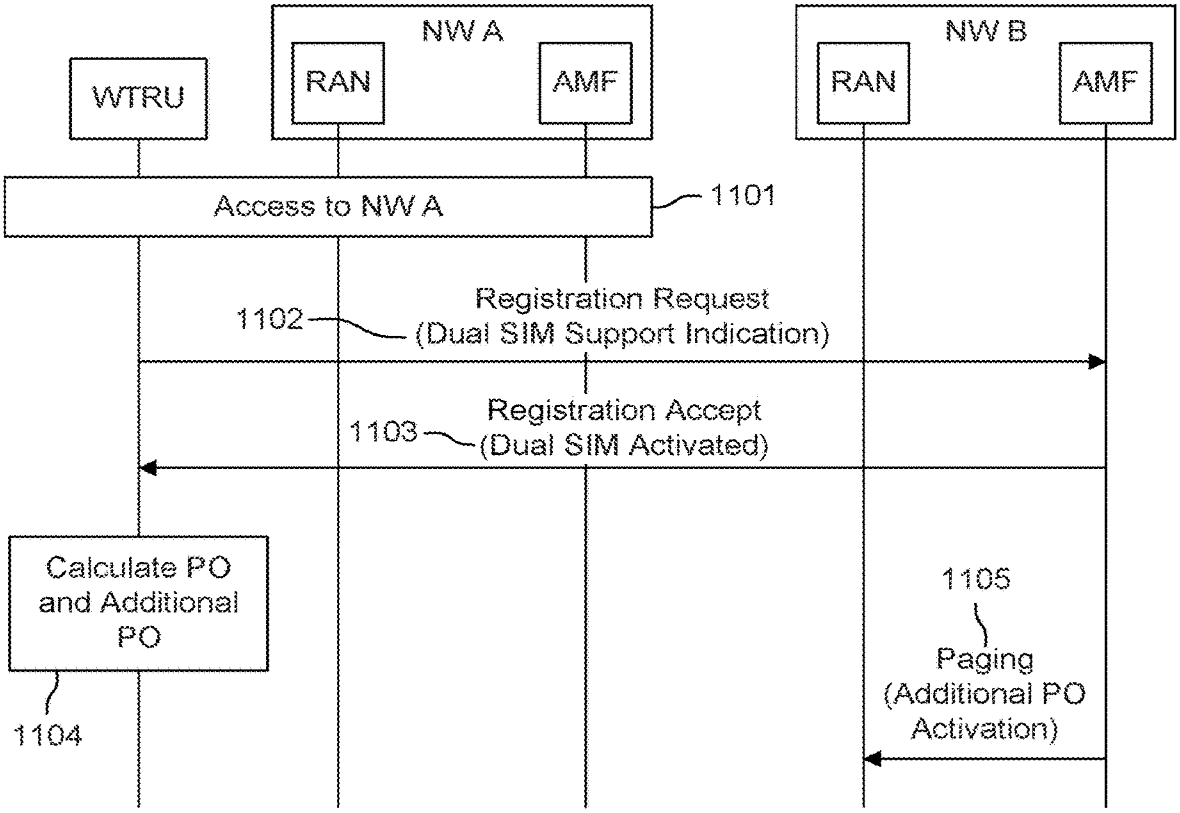
FIG. 11 illustrates the method shown in FIG. 10 in more detail.

Now turning to FIG. 11 to further describe the method according to the above-discussed fourth embodiment. FIG. 11 illustrates processes from the WTRU and its related processes from networks. As shown in FIG. 11, the method 1100 may comprise: at 1101, the WTRU may access NW A; at 1102, the WTRU may access NW B and include Dual SIM support Indication in the Registration Request message (i.e., to request additional paging occasion from NW B); at 1103, AMF in NW B may send Registration Accept message which includes Dual SIM Activated to the WTRU (i.e., to transmit additional paging occasion activation indication); at 1104, the WTRU may calculate paging occasion and additional paging occasion in NW B and, the WTRU may listen at both paging occasions in NW B or listen at only one of them that has no collision with the paging occasion in NW A; at 1105, when sending paging message to the RAN, the AMF in NW B may indicate the additional paging occasion is activated; and/or, the RAN may perform paging in both the paging occasion and the additional paging occasion.

The following description will describe the fifth embodiment according to the present application. In the fifth embodiment, paging occasion collision avoidance may be accomplished by the activation of repeat paging in one or both networks. The WTRU may indicate to the networks that dual SIM is supported when the WTRU accesses both networks. The WTRU may listen at the paging occasions alternately between two networks. When paging is performed, the network may repeat paging at the paging occasion. The above-mentioned general principle of the fifth embodiment will be described in detail below. Again, the fifth embodiment will be discussed within the same two-network scenario as discussed above in the first and second embodiments.

The following description will further discuss the fifth embodiment with reference to FIG. 5A. As shown in FIG. 5A, there is a paging occasion collision at subframe 9 (paging occasion) in radio frame 4 (paging frame). Since the WTRU has only one receiver, thereby being able to monitor only one network at a paging occasion, the WTRU may monitor the two networks alternately.

The WTRU may perform monitoring NW A and NW B alternately in a strictly equal way. In other words, the WTRU will equally alternate between paging occasion from NW A and paging occasion from NW B. For example, the WTRU may wake up and monitor NW A at the paging occasion in the first paging frame, and then may wake up and monitor NW B at the paging occasion in the second paging frame, and then wake up and monitor NW A at the paging occasion in the third paging frame, and then wake up and monitor NW B at the paging occasion in the fourth paging frame, and so on.

The WTRU may perform monitoring NW A and NW B alternately in a stochastic way. In other words, the distribution of monitoring the two networks may be pseudo-random with various distribution function (e.g., normal distribution).

The WTRU may perform monitoring NW A and NW B alternately based on a pre-determined or pre-provisioned WTRU policy. For example, the WTRU may monitor NW A and NW B alternately based on day of the week or time of the day.

The WTRU may perform monitoring NW A and NW B alternately based on the application requests. For example, the WTRU may monitor NW A and NW B alternately in the following way: the WTRU wakes up and monitors NW A more often than it does for NW B.

The WTRU may notify multiple networks in one of the initial messages that it is able to modulate its listening distribution patterns for multiple paging occasions on the multiple networks based on static or dynamic parameters or internal or on external policies.

In one embodiment, the WTRU may indicate that dual SIM is supported when the WTRU registers to each network. In another embodiment, the WTRU may indicate that dual SIM is supported only when registering to one of the networks (e.g., NW B), and thus in this way the paging message repetition is activated only on one of the networks (i.e., when dual SIM support is indicated during registration). Then, the WTRU may receive from the AMF information related to the paging repetition, such as the number of paging repetitions. Then, the WTRU may listen at paging occasions alternately between the two networks. In another embodiment, the paging repetition may be activated only for one of the networks. In another embodiment, the WTRU may prioritize listening to possible paging messages from the network that does not perform paging message repetition.

Accordingly, AMF of a network may perform the following processes: receiving an indication of dual SIM support from the WTRU (e.g., Registration Request with Dual SIM supported indication); determining whether repeat paging is necessary for the WTRU based on the Dual SIM supported indication; providing an expected paging repetition pattern information to the WTRU during registration as mentioned above; sending to the RAN a paging message indicating repeat paging times (e.g., Intended Number of Paging Attempts).

Again, the embodiments described herein may use two networks or two USIMs (dual-USIM) as an exemplary scenario. The same procedures may be applicable to devices supporting more than two USIMs.

Figure 12:
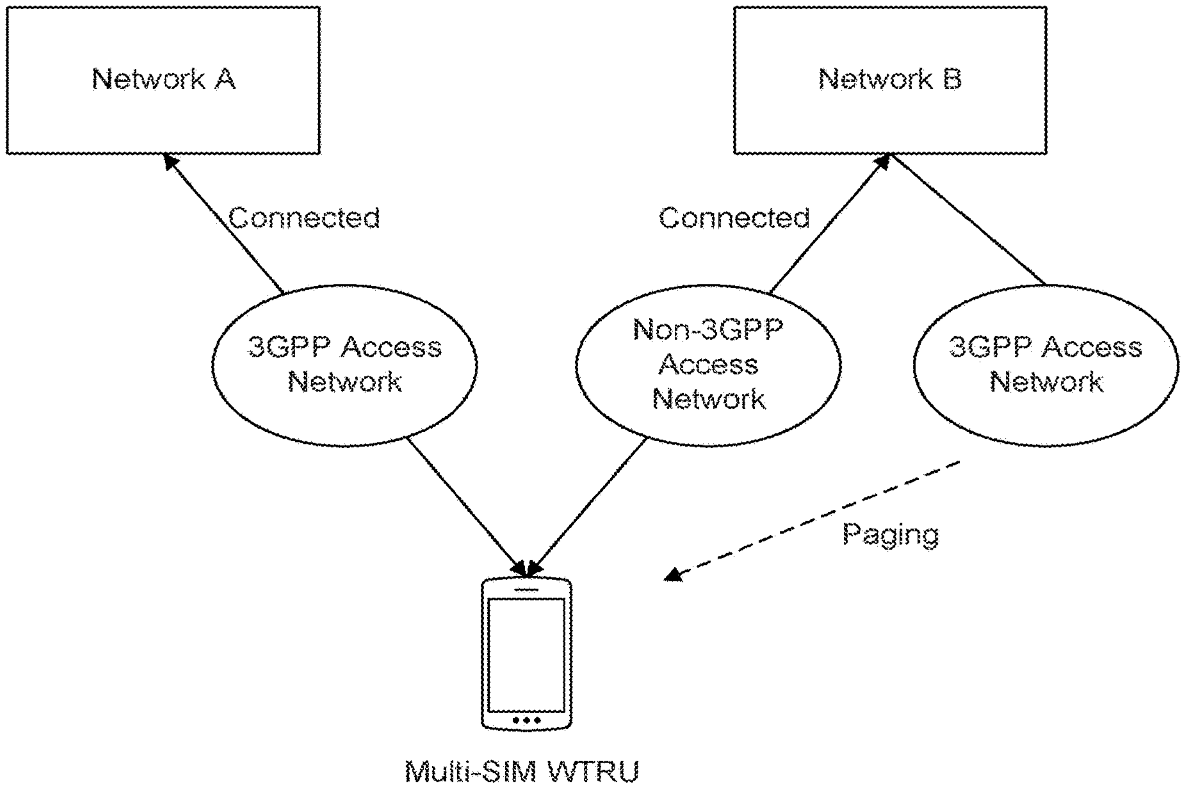
FIG. 12 illustrates a scenario where a WTRU and a method according to the sixth embodiment in this application may be applied.
Figure 13:
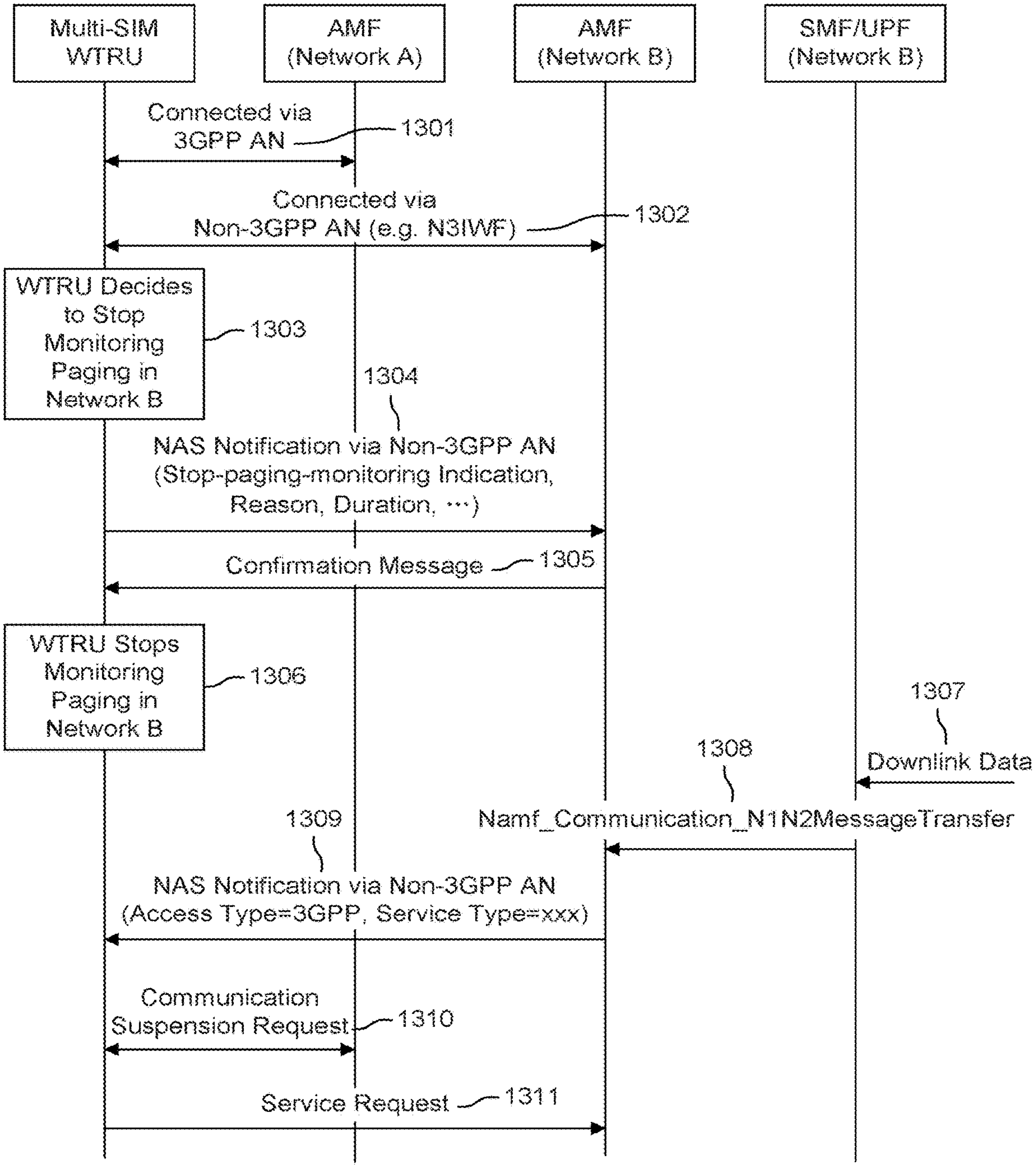
FIG. 13 illustrates a method according to the sixth embodiment in this application.
Figure 14:
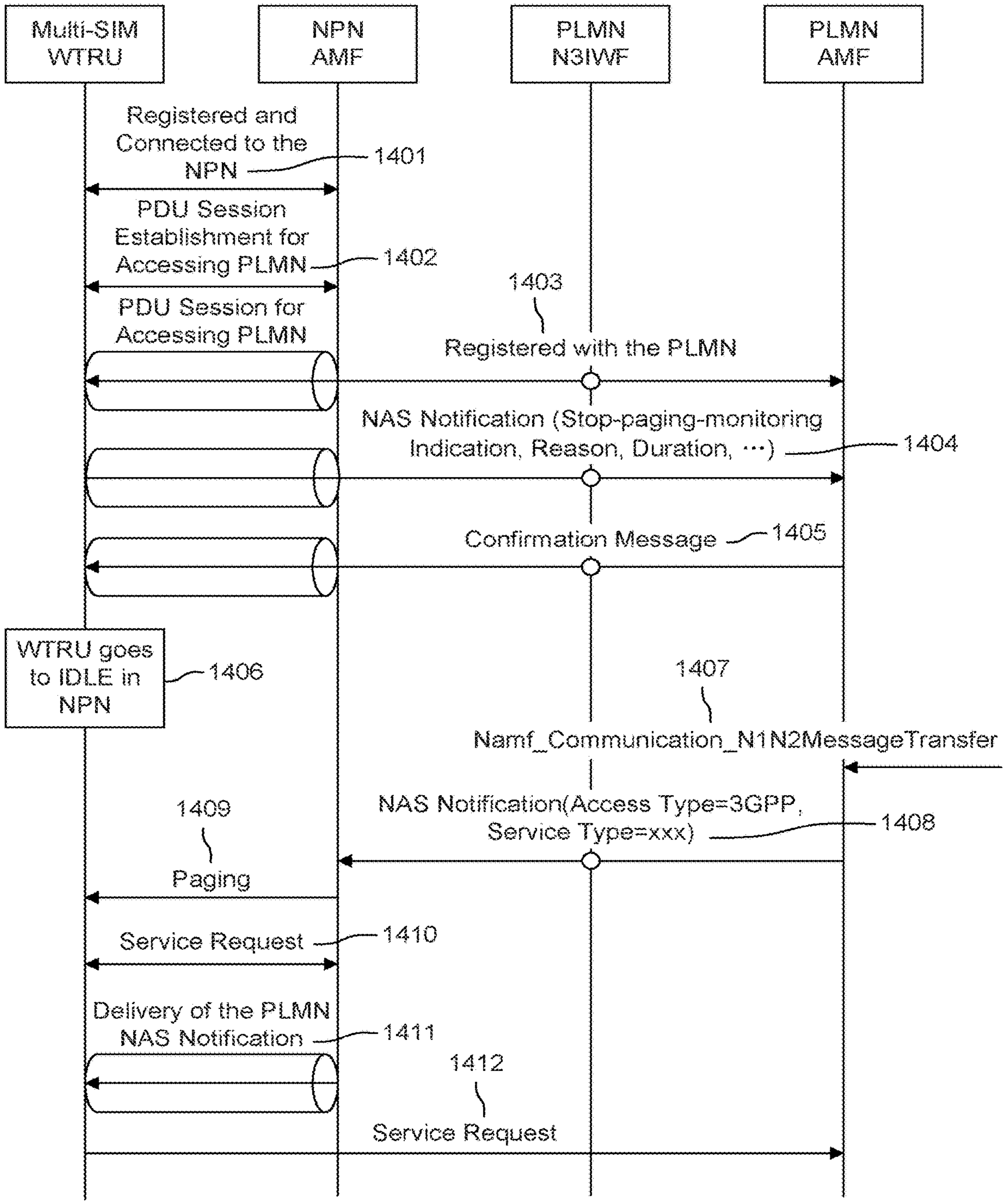
FIG. 14 illustrates another method according to the sixth embodiment in this application.

The sixth embodiment is described in detail below with reference to FIGS. 12-14. FIG. 12 illustrates a scenario where a WTRU and a method according to the sixth embodiment may be applied. FIG. 13 illustrates a method according to the sixth embodiment in this application. FIG. 14 illustrates another method according to the sixth embodiment in this application.

In the sixth embodiment, paging occasion collision avoidance may be accomplished by reaching the WTRU via Non-3GPP access. As shown in FIG. 12, the WTRU is connected with Network A through a 3GPP Access Network, while the WTRU is in a Connected mode with Network B through a non-3GPP Access Network. In this scenario, the WTRU may stop monitoring the paging in that Network B. As shown in FIG. 13, the method 1300 may comprises different processes from 1301 to 1311. Those processes will be described below in detail.

As shown in FIG. 13, at 1301, the WTRU may be connected with Network A via a 3GPP AN (Access Network). To be more specific, the Multi-SM WTRU may be in a Connected mode via 3GPP access in Network A and have an active communication service. At 1302, the WTRU may be connected with Network B via a Non-3GPP AN (e.g., N3IWF). That is, the WTRU may be in a Connected mode via Non-3GPP access in Network B but may be in an IDLE mode on 3GPP access.

Based on the fact that the WTRU has active service in Network A and is reachable via Non-3GPP access in Network B, the WTRU may determine that it may stop monitoring the Paging in Network B. As shown at 1303, the WTRU may decide to stop monitoring the paging in Network B. Preferably, the WTRU may decide to stop monitoring the paging in a network when all or part of the following conditions are satisfied: (1) the WTRU is a Multi-SIM WTRU and has registered with multiple networks; (2) the WTRU is in an IDLE mode or in active service in one network (e.g., Network A); (3) the WTRU is in a Connected mode on Non-3GPP access with another network (e.g., Network B), which means Network B has the means to reach the WTRU via Non-3GPP access. It should be noted that the above-mentioned conditions are only given by way of example, and they are not intended to be exclusive or be limited to the sixth embodiment. Any other available condition could be applied as long as that condition is consistent with the general principle of this embodiment.

The WTRU may also have a local or network provided configuration on whether it may stop monitoring paging in a network when some conditions are satisfied.

When the WTRU has decided to stop monitoring paging in Network B, it may inform Network B of this decision with the following three methods.

First, the WTRU may directly inform the serving mobility management function/entity in Network B. For example, the WTRU may send a NAS Notification message via the Non-3GPP connection to the serving AMF in Network B. In other words, the WTRU may send a NAS Notification message to Network B to inform Network B of its decision to stop monitoring Paging, the reason for that decision and the duration of not monitoring. As shown in FIG. 13, at 1304, the WTRU may send a NAS Notification message via the Non-3GPP AN, and the NAS Notification message may include Stop-paging-monitoring Indication, reason, duration, etc. The following description will further describe the NAS Notification.

Second, the WTRU may directly inform the AMF in the Network B when registering via Non-3GPP of a preference for the WTRU to use a notification over Non-3GPP rather than a conventional paging over 3GPP. The WTRU may receive a confirmation in the Registration Accept message indicating that the WTRU may stop (e.g., is authorized to stop) monitoring paging. The message may contain timing information for monitoring paging to synchronize the WTRU and the network as described below in an alternative network triggered procedure.

Third, the WTRU may indirectly inform the serving mobility management function/entity in Network B via the serving mobility management function/entity in Network A. For example, the WTRU may send a NAS Notification message to the serving AMF in Network A and the AMF may forward the message to the serving AMF in Network B.

Alternatively or in addition to the above, the AMF in Network B may update at any time when a WTRU Configuration Command with information indicates that the WTRU may stop monitoring paging on Network B (i.e., network triggered procedure). This information may be based on subscription information and/or local network policy (e.g., considering non-3GPP access properties as described below) and/or local regulations. The WTRU may acknowledge the AMF that it shall stop or continue monitoring of paging by providing an indication in a WTRU Configuration Complete message. This decision by the WTRU whether to stop or continue monitoring paging may be based on one or more of the following factors: (1) a User preference in the WTRU; (2) attribute(s) of the non-3GPP access network (e.g., trusted or non-trusted, SSID, QoS metric(s) such as RTT to known server, location); (3) whether the WTRU is in its home PLMN or roaming (i.e., Network B is the UE HPLMN or a VPLMN).

The WTRU may also include in the NAS Notification message a time reference when the WTRU will stop monitoring Paging (e.g., immediately, in the future). This timing information may be used to synchronize the WTRU and the network on a given cut off time when network B may stop paging and the WTRU may stop monitoring paging. This synchronization may be used by the WTRU and network to mitigate the risks of missing paging messages while the WTRU transitions to listening to non-3GPP notifications only.

Besides the indication (e.g., Stop-paging-monitoring shown in FIG. 13) that the WTRU may stop monitoring the paging, the notification message may also contain the following information: (1) the duration of the period that the WTRU may stop monitoring the paging; (2) the reason for stopping monitoring the paging; and/or (3) WTRU identifiers in Network B, which may help the AMF in Network A to locate the AMF in Network B and forward the message.

Then, the Network B may verify whether to allow the WTRU to stop monitoring paging, based on network policies and WTRU profile. If the Network B accepts the WTRU decision, it may send a confirmation message to the WTRU. For example, the Network B may respond with a confirmation message (as shown at 1305) if it agrees with the WTRU's decision, or a rejection message otherwise.

Then, at 1306, once the WTRU receives the confirmation message, it may stop monitoring paging in the Network B.

Further, after the Network B receives such a NAS Notification at 1304 and agrees to let the WTRU stop monitoring paging, when there is downlink data/signaling for the WTRU (shown at 1307) and the SMF informs the AMF of the downlink data arrival and the PDU Session ID related to the data (shown at 1308), the AMF in Network B may, at 1309, send a downlink NAS Notification message via the Non-3GPP connection, instead of paging the WTRU in the 3GPP air interface. In other words, at 1309, the serving AMF in Network B understands that the WTRU is not monitoring paging in Network B at the moment, so it may choose to send a downlink Notification message to the WTRU via the Non-3GPP connection. Besides the Access Type (i.e. 3GPP access in this case), the downlink Notification message may carry the following additional information which may help the WTRU determine the priority or importance of the downlink data/signaling in Network B: type of service which has triggered downlink communication. For example, it may indicate that the downlink data or signaling is related to Short Message.

Then, at 1310, upon receiving the downlink Notification message via the Non-3GPP connection, based on the priority information in the message, the WTRU may request to suspend its active service with the Network A and switch to the Network B, or ignore the downlink communication request from the Network B and continue its ongoing service with the Network A. Then, at 1311, the WTRU may switch to the Network B and initiate Service Request procedure to get connected with Network B.

If the duration of the period of not monitoring paging, for which the WTRU has indicated to the Network B, has expired, the WTRU may resume monitoring paging in the Network B or send another Notification message to the Network B to extend the duration.

If at any time the conditions have changed, for example, the service with Network A has finished, and the WTRU determines to resume monitoring paging in the Network B, it may resume monitoring paging in the Network B and inform the Network B of this change. If at any time the WTRU has lost the Non-3GPP connection with the Network B, the WTRU may resume monitoring paging in Network B. This condition may be triggered when the WTRU transitions to CM-IDLE, i.e., the NAS Signaling Connection is released, e.g., when the WTRU detects that AN (i.e., the Nwu connection) is released. Alternatively or additionally, the condition may be triggered after the WTRU Non-3GPP Deregistration timer expires. And the Network B may disregard previously received Notification (that WTRU is not monitoring) and initiate paging when needed.

The above-discussed method in the sixth embodiment can also be used in a scenario where one network is a PLMN and the other network is a Non-Public Network (NPN). This scenario will be described below with reference to FIG. 14.

The WTRU may be registered and connected in NPN (or PLMN), but may at the same time be registered with the PLMN (or NPN) and access the services of the PLMN (or NPN) through the N3IWF of the PLMN (or NPN). From the perspective of the PLMN (or the NPN), the WTRU is accessing the network through Non-3GPP access. In this scenario, if the WTRU is connected with the NPN and accessing the PLMN services of PLMN, the WTRU may also notify the PLMN that it is not available over the 3GPP access of the PLMN and will not monitor the paging in the PLMN. When downlink data arrives in the PLMN for the 3GPP access, the PLMN may send NAS Notification message over the N3IWF in the PLMAN and the NPN network to the WTRU. If the WTRU is in an IDLE mode with the NPN, the NAS Notification message from the PLMN will trigger the NPN to page the WTRU and get it to the Connected mode and deliver the PLMN NAS Notification message. Then, upon the information in the NAS Notification, the WTRU may decide to switch to the PLMN network. The high-level procedure of applying the method in this scenario is shown in FIG. 14. Similarly, when the WTRU is registered and connected with the PLMN and also accessing the NPN services through the N3IWF in NPN, the same method can apply for the WTRU to receive the Notification from the NPN.

As shown in FIG. 14, the method 1400 may comprise the following processes: at 1401, the Multi-SIM WTRU may be registered and connected with the NPN; at 1402, the WTRU may establish a PDU session in the NPN for accessing the PLMN services; at 1403, the WTRU may register with the PLMN over the PDU Session and through the N3IWF in the PLMN; at 1404, the WTRU may send a NAS Notification message to the PLMN to inform that it is currently not available over the 3GPP access for PLMN, and will not monitor the Paging in the PLMN; at 1405, if the Network B accepts the WTRU's decision, it may send a confirmation message to the WTRU; at 1406, the WTRU may go to the IDLE mode in the NPN; at 1407, Downlink data arrival in the PLMN and the PLMN AMF may be informed; at 1408, the PLMN AMF understands that the WTRU is not monitoring Paging at the moment, so it may choose to send a downlink Notification message to the UE via the N3IWF; at 1409, the PLMN NAS Notification message, which is considered as downlink data in the NPN, will trigger the NPN AMF to page the WTRU; at 1410, the WTRU may initiate Service Request in NPN and go into Connected mode; at 1411, the NPN may deliver the PLMN NAS Notification message to the WTRU; at 1412, upon receiving the downlink Notification and the Service Type information in the message, the WTRU may switch to the PLMN cell and initiates Service Request procedure to get connected with the PLMN. The WTRU may also inform the NPN to suspend or buffer the service data in the NPN.

The following description will discuss a handshake procedure with a network during the registration phase as shown in FIGS. 6B, 9, 11 and 13.

As a first step, the WTRU may inform a network that it intends to register two USIM cards in the same operator's network (NW). The WTRU may also inform the NW whether there is a preference for one USIM or the other, e.g., based on URSP polices, user input or the relative priority of applications allocated to the respective USIM. This can be achieved by sending a flag, or a new information element, or indicator in the Registration Request message (e.g., Registration Request shown in FIG. 6B). Note that to ensure that the same AMF handles both requests, the WTRU may select the same S-NSSAI or a S-NSSAI that leads to the same AMF for both USIMs. In addition, the gNBs need to be configured to route the Registration request from the two USIMs when the applicable S-NSSAI is selected.

As a second step, the NW (e.g. AMF) may inform the WTRU about rules and policies for paging. This can be done e.g. in the Registration Accept message (e.g., Registration Accept shown in FIG. 6B) or by sending a separate message such as Configuration Update Command. The important piece here is that the NW may inform the WTRU about how it can page the WTRU on one channel, directly related to e.g. USIM1, for services related to the other subscription (i.e. USIM2).

In one embodiment, the NW may, as expected, allocate two separate unique 5G-GUTIs to the WTRU; one for USIM1 (called GUTI1) and one for USIM2 (called GUTI2). As already defined in 3GPP, the WTRU will then have two S-TMSIs, one for each GUTI. They may be referred to as S-TMSI1 and S-TMSI2 respectively. The normal operation, hence, would be that the NW pages the USIM1 using S-TMSI1 on the paging occasion that both the WTRU and RAN calculate based on GUTI1 and it pages the USIM2 using S-TMSI2 on the paging occasion that both the WTRU and RAN calculate based on GUTI2. Then, the NW (and the WTRU) may employ an enhanced and optimized operation so that the WTRU may only need to monitor one paging occasion at a time. To make this optimization feasible, the WTRU will be informed (during the registration procedure) that it may, for example, only listen at the paging occasion that is calculated based on GUTI1. This determination may take into consideration the WTRU's preference for a particular USIM. However, the NW may send an indicator in the paging message, along with the WTRU's paging ID (i.e. S-TMSI1) that this particular paging is, in fact, for GUTI2. In yet another embodiment, the NW may inform the WTRU that it may page the WTRU on one paging occasion (e.g. the one for GUTI1) using the paging identity of the other USIM card, i.e. S-TMSI2. In order to make this (latter) solution/proposal even more robust, the NW and the WTRU may negotiate the usage of an e.g. Scrambling Code for the S-TMSI2. For example, when the NW pages on a paging occasion related to USIM1 for a service related to USIM2, the NW may scramble or encode the WTRU's paging ID, i.e. S-TMSI2 with another unique ID. This latter unique ID could for example be the IMEI of the WTRU or applicable S-NSSAI. Alternatively, the NW and may inform the WTRU, during the registration phase, of a unique sequence that both the WTRU and the NW may use to scramble or encode the S-TMSI2. This solution is rather important in order for other possible WTRUs, that are monitoring the same paging occasion, not to assume that they have been paged by the NW. Hence, the WTRUs may not send a response to paging back to the NW. The WTRU, which has received a paging message related to a service for USIM2, may then respond by sending a Service Request message (e.g., Service Request shown in FIG. 13), where it will identify itself with S-TMSI2 and also use the credentials for USIM2 in order to protect the message.

In another embodiment, after the network receives the WTRU's dual registration for dual USIM, e.g. the WTRU may indicate dual registration by including ID (e.g. S-TMSI) of first USIM in the second Registration Request for second USIM or the network may determine two separate Registration Request procedures are performed by the same WTRU, e.g. based on WTRU's subscription, the network may pre-calculate paging occasion (e.g. based SFN mod T=(T div N)*(WTRU_ID mod N) details in 3GPP TS 36.403) for the two USIMs when allocating S-TMSI to them. The network shall ensure the paging occasions calculated for two S-TMSIs are the same, e.g. by allocating S-TMSI1 and S-TMSI2 to make S-TMSI1 mod N equal to S-TMSI2 mod N. For the dual USIM WTRU, since the paging occasion is calculated for both USIMs, when both USIMs access to same radio network, the WTRU may only monitor this paging occasion.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising a processor configured to:

receive a first 5G System Architecture Evolution (SAE) Temporary Mobile Subscriber Identity (TMSI) (5G-S-TMSI) and a first discontinuous reception (DRX) cycle length associated with a first network;

receive a second 5G-S-TMSI and a second DRX cycle length associated with a second network;

determine a first paging occasion (PO) based on the first 5G-S-TMSI and the first DRX cycle length and a second PO based on the second 5G-S-TMSI and the second DRX cycle length;

send a registration request message to an access control and mobility function (AMF) associated with at least one of the first network or the second network, the registration request message indicating to the AMF to send the WTRU a new 5G-S-TMSI;

receive a registration accept message from at least one of the first network or the second network, the registration accept message comprising the new 5G-S-TMSI.

2. The WTRU of claim 1, wherein being configured to determine the first PO and the second PO comprises the processor being configured to:

calculate the first PO using a first parameter; and calculate the second PO using a second parameter, wherein on condition that the registration request message is sent to the first network, the first 5G-S-TMSI is different from the first parameter; and on condition that the registration request message is sent to the second network, the second 5G-S-TMSI is different from the second parameter.

3. The WTRU of claim 1, wherein the registration request message comprises an overlapping pattern indication indicating when the first PO and the second PO are overlapping.

4. The WTRU of claim 1, wherein the processor is further configured to select the first network or the second network to send the registration request message.

5. The WTRU of claim 4, wherein the first network or the second network are selected based on an operator policy or a power optimization preference of the WTRU.

6. The WTRU of claim 1, wherein the processor is further configured to determine a third PO based on the new 5G-S-TMSI.

7. The WTRU of claim 6, wherein the third PO is determined based on an additional PO equation.

8. The WTRU of claim 6, wherein the third PO is determined by adding an offset to an existing PO.

9. The WTRU of claim 1, wherein the processor is further configured to determine a PO collision between the first PO and the second PO.

10. The WTRU of claim 9, wherein the first PO occurs at a first time and the second PO occurs at a second time, and wherein the PO collision is determined based on the first time being the same as the second time.

11. A method performed by a wireless transmit/receive unit (WTRU), the method comprising:

receiving a first 5G System (S) Temporary Mobile Subscriber Identity (TMSI) (5G-S-TMSI) and a first discontinuous reception (DRX) cycle length associated with a first network;

receiving a second 5G-S-TMSI and a second DRX cycle length associated with a second network;

determining a first paging occasion (PO) based on the first 5G-S-TMSI and the first DRX cycle length and a second PO based on the second 5G-S-TMSI and the second DRX cycle length;

sending a registration request message to an access control and mobility function (AMF) associated with at least one of the first network or the second network, the registration request message indicating to the AMF to send the WTRU a new 5G-S-TMSI;

receiving a registration accept message from at least one of the first network or the second network, the registration accept message comprising the new 5G-S-TMSI.

12. The method of claim 11, wherein determining the first PO and the second PO comprises:

calculating the first PO using a first parameter; and calculating the second PO using a second parameter, wherein on condition that the registration request message is sent to the first network, the first 5G-S-TMSI is different from the first parameter; and on condition that the registration request message is sent to the second network, the second 5G-S-TMSI is different from the second parameter.

13. The method of claim 11, wherein the registration request message comprises an overlapping pattern indication indicating when the first PO and the second PO are overlapping.

14. The method of claim 11, further comprising selecting the first network or the second network to send the registration request message.

15. The method of claim 14, wherein the first network or the second network are selected based on an operator policy or a power optimization preference of the WTRU.

16. The method of claim 11, further comprising determining a third PO based on the new 5G-S-TMSI.

17. The method of claim 16, wherein the third PO is determined based on an additional PO equation.

18. The method of claim 16, wherein the third PO is determined by adding an offset to an existing PO.

19. The method of claim 11, further comprising determining a PO collision between the first PO and the second PO.

20. The method of claim 19, wherein the first PO occurs at a first time and the second PO occurs at a second time, and wherein the PO collision is determined based on the first time being the same as the second time.

* * * * *